United States Patent [19]
Sugiyama et al.

[11] Patent Number: 5,614,938
[45] Date of Patent: Mar. 25, 1997

[54] THREE-DIMENSIONAL RECORDING AND REPRODUCING APPARATUS

[75] Inventors: Hisataka Sugiyama, Kodaira; Takeshi Maeda; Kiyoshi Matsumoto, both of Kokubunji; Motoyasu Terao, Tokyo; Shigenori Okamine, Kodaira; Tetsuya Nishida, Hachioji; Harukazu Miyamoto, Kodaira, all of Japan

[73] Assignee: Hitachi, Ltd., Tokyo, Japan

[21] Appl. No.: 464,461

[22] Filed: Jun. 5, 1995

Related U.S. Application Data

[63] Continuation of Ser. No. 427,866, Apr. 26, 1995, abandoned, which is a continuation of Ser. No. 958,162, Oct. 8, 1992, Pat. No. 5,414,451.

[30] Foreign Application Priority Data

Oct. 11, 1991 [JP] Japan .................................. 3-263561

[51] Int. Cl.$^6$ ............................................ B41J 2/47
[52] U.S. Cl. ................................ 347/247; 347/262
[58] Field of Search .................... 347/256, 262, 347/258, 247; 369/112, 118

[56] References Cited

U.S. PATENT DOCUMENTS

| | | |
|---|---|---|
| 4,450,553 | 5/1984 | Holster et al. |
| 4,641,023 | 2/1987 | Ando et al. ............................. 250/216 |
| 4,682,315 | 7/1987 | Uejima . |
| 5,097,464 | 3/1992 | Nishiuchi et al. |
| 5,126,996 | 6/1992 | Iida et al. |
| 5,134,604 | 7/1992 | Nagashima . |

FOREIGN PATENT DOCUMENTS

| | | |
|---|---|---|
| 59127237 | 7/1984 | Japan . |
| 60202545 | 10/1985 | Japan . |
| 6353722 | 3/1988 | Japan . |
| 63231738 | 9/1988 | Japan . |
| 119535 | 1/1989 | Japan . |
| 3116548 | 5/1991 | Japan . |
| 63231738 | 7/1991 | Japan . |
| 3219440 | 9/1991 | Japan . |
| 56546 | 1/1993 | Japan . |

OTHER PUBLICATIONS

"Jitter Analysis I to V of Eye-Pattern in Optical Disk", by Kubota et al, Optics, No. 14, (1985).
"Digital Audio", by T. Doi et al, published by Radio Technology, pp. 322–325.

*Primary Examiner*—Mark J. Reinhart
*Attorney, Agent, or Firm*—Antonelli, Terry, Stout & Kraus, LLP

[57] ABSTRACT

In a three-dimensional recording and reproducing apparatus having a recording medium including a plurality of recording layers stacked on a substrate and an optical system for converging a light irradiated from the substrate side on each of the plurality of recording layers to three-dimensionally record and reproduce information, the following equation is satisfied:

$$\lambda/4 \leq (1/8NB)(1/NB^2 - 1)NAF^4 \Delta d$$

where
$\lambda$: Wavelength of the light;
NB: Refractivity of the substrate 3;
NAF: Numerical aperture of a focus lens 8 for converging a light;
$\Delta d$: Positional range in the optical axis direction in which exists a recording layer on which the light is to be converged.

A light spot is focused on each layer of the multi-layer structured disc to record and reproduce highly reliable data in a high density.

5 Claims, 27 Drawing Sheets

EXAMPLE OF INFINITE OPTICS

EXAMPLE OF LIMITED OPTICS

AGC FREQUENCY
CHARACTERISTIC

DATA FORMAT ON K$^{TH}$ LAYER

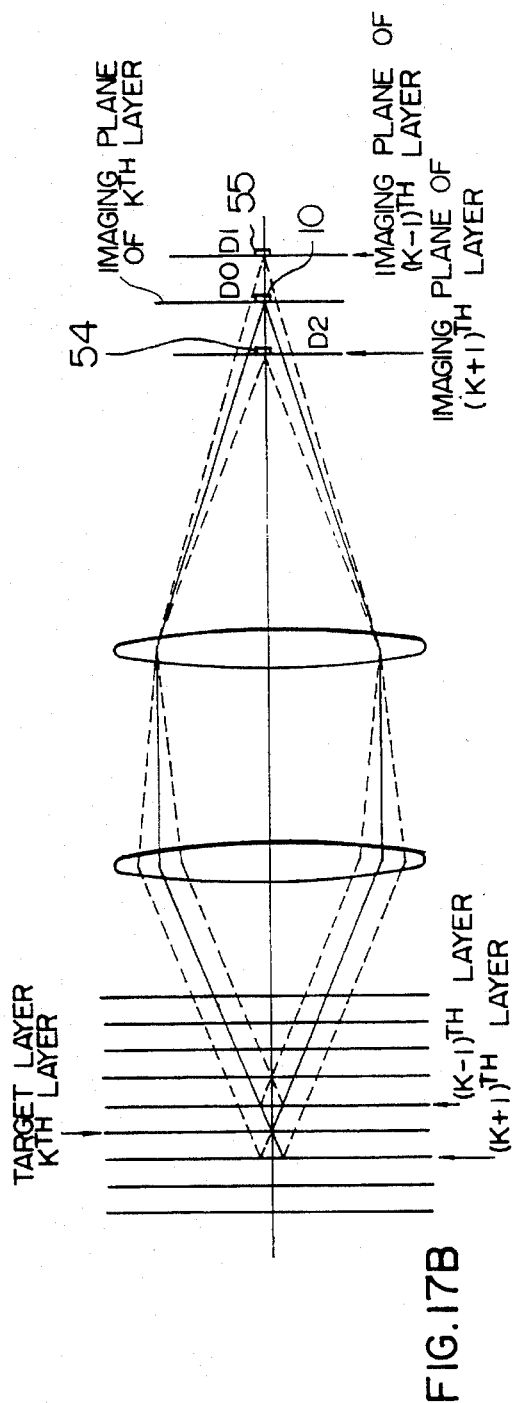
FIG. 17A
FIG. 17B
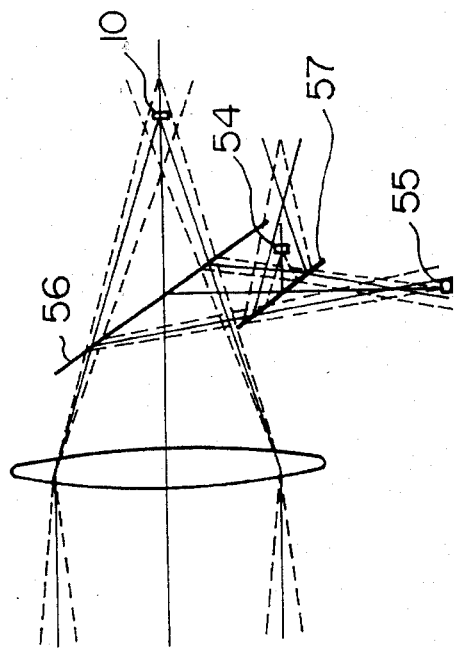
FIG. 17C

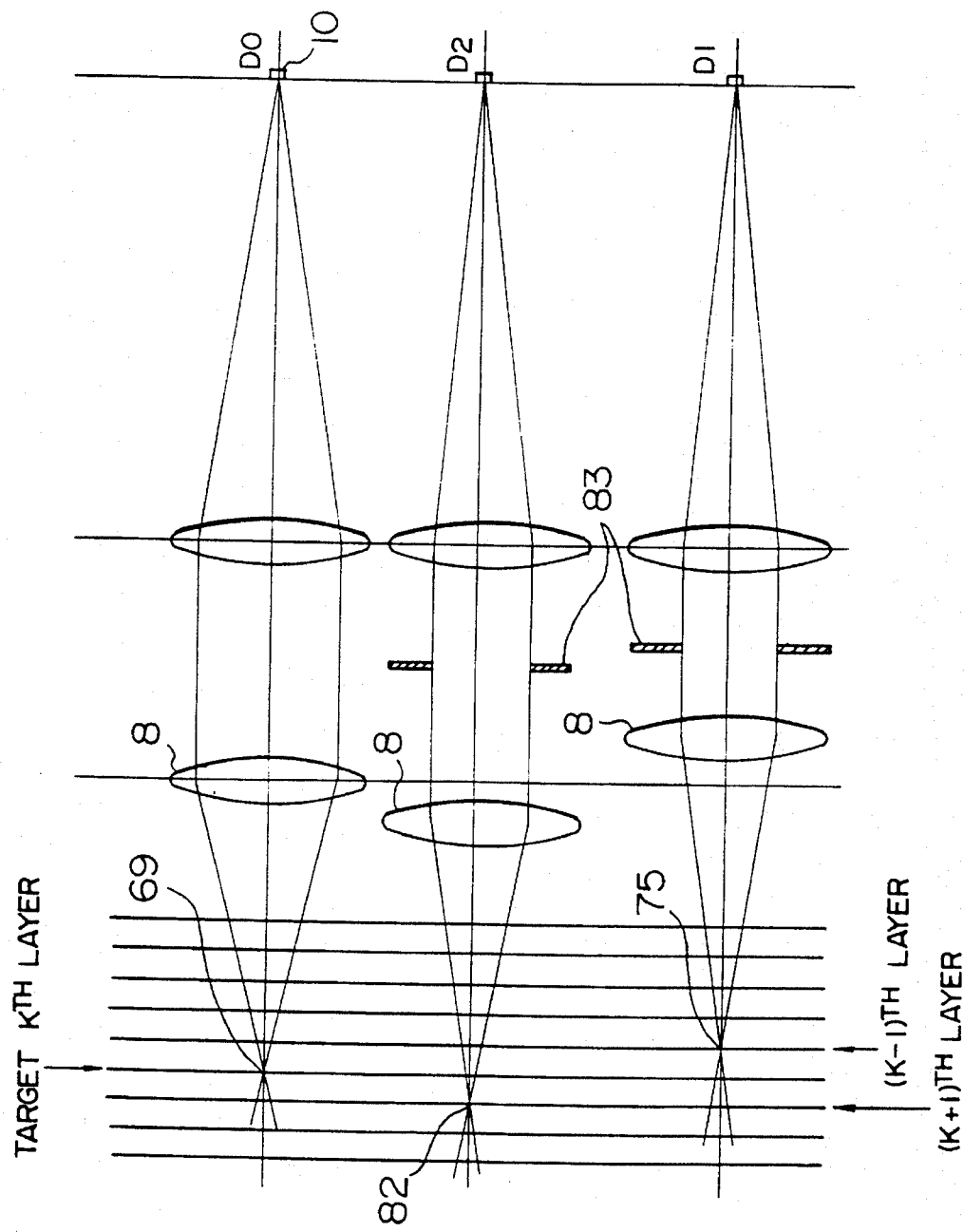

THREE-DIMENSIONAL RECORDING AND REPRODUCING APPARATUS

This application is a continuation of application Ser. No. 08/427,866, filed Apr. 26, 1995, abandoned which is a continuation of application Ser. No. 07/958,162, filed Oct. 8, 1992 abandoned, now U.S. Pat. No. 5,414,451, issued May 9, 1995.

BACKGROUND OF THE INVENTION

The present invention relates to an optical information recording/reproducing apparatus, and more particularly to an information recording/reproducing apparatus for achieving a high recording density.

A method for increasing the recording density for an optical information recording/reproducing apparatus has conventionally been accomplished by improving a recording plane density on a two-dimensional plane of a recording medium. However, since the size of information recording media, such as a disc, is restricted due to compactization of the apparatus, two-dimensional approach to high density will reach its limit. As a method of achieving a higher density, there has been proposed a three-dimensional recording/reproducing method which is related with the record in the depth direction of a recording medium.

For example, the JP-A-59-127237 discloses that information is recorded on two recording layers by using two lights of different wavelengths. In this event, when a light irradiates a recording layer on the incident plane side through the other recording layer, energy of the light is absorbed in the recording layer on the incident plane side, whereby information is unintentionally recorded thereon. Therefore, in JP-A-59-127237, writing on the other recording layer is only allowed after information has been recorded on the recording layer on the incident side. More specifically, following three-value informations can be recorded for the states where information is recorded on both two recording layers; no information is recorded on both recording layers; and information is recorded only on the recording layer on the incident plane side.

However, the JP-A-59-127237 does not disclose a method of independently recording binary information on each of multi-layer recording film.

Also, the JP-A-60-202545 discloses a method of focusing a laser beam on each layer of the multi-layer recording films. Generally, a focusing servo circuit focuses a laser beam on a recording film by supplying an electric offset when the beam is out of focus. By utilizing this method, offset voltages corresponding to respective inter-layer gaps in the multi-layer recording film have previously been prepared. Then, one of the offset voltages corresponding to a layer to be focused is supplied to focus the laser beam on that layer.

However, the JP-A-60-202545 does not disclose any means for corresponding the multi-layer recording film to the offset voltages.

Also, the JP-A-60-202554 discloses a multi-layer recording medium in which inter-layer gaps are formed equal or larger than an operating range of a focus error signal by more than the same operating range. However, the JP-A-60-202554 does not describe specific inter-layer gaps and an access method of actually focusing a beam on a target layer.

SUMMARY OF THE INVENTION

The foregoing conventional documents disclose performing multiple-value recording and multiplex recording by using a multi-layer recording film. However, in order to practically perform multiplex recording or reproduction, optical systems including a focus control or a track control must be investigated on the influence of reflection or absorption of light on each layer of the multi-layer film.

It is an object of the present invention to provide a three-dimensional recording and reproducing apparatus including an optical system capable of stably recording and reproducing information by the use of a recording medium comprising a multiple recording layer.

It is another object of the present invention to provide a signal control method suitable for use in the recording medium comprising a multiple recording layer, particularly, a coding system for suppressing cross-talk between adjacent layers, and a cross-talk canceling system.

It is a further object of the present invention to provide a structure of a recording medium suitable for multiplex-recording, a three-dimensional data format and a medium producing method.

The above objects are achieved by the following means.

In a disc comprising a plurality of recording film layers on which optical properties are locally changed by irradiating locally with a light and intermediate layers each composed of an assistant layer for the operation of the recording layer (a layer provided for the purpose of reflection protection, multiple reflection, light absorption, transfer of changes in the local optical properties of the recording layer, heat insulation, heat absorption, heat generation or reinforcement) or a stack of assistant layers, each local optical property of the recording layers is individually and two-dimensionally changed by irradiating with a light focused on each recording layer, thereby performing recording corresponding to modulated data "1" and "0."

Further, in a three-dimensional recording and reproducing apparatus for detecting changes of the local optical properties as changes in a reflected light amount (or a transmitting light amount) of a light spot irradiated to each assistant layer and reproducing data based on the detected change, the structure of the disc is determined as follows:

The refractivity and thickness of the optically transparent substrate are represented by NB and d0, respectively. An intermediate layer and a recording layer are collected as a single layer, and first to $N_{th}$ layers are designated sequentially from the top layer. A distance between the centers of adjacent $k_{th}$ and $(k-1)_{th}$ recording film layers is represented by dk. The thicknesses of an arbitrary $k_{th}$ recording layer and intermediate layer are represented by dFk and dMk, respectively, and the real parts of the refractivities of the same are represented by NFk and NMk, respectively. A cycle of changes of the local optical properties on the plane of each layer is represented by b [μm]. A focusing optical system employs, for example, a semiconductor laser emitting a light of a wavelength λ [μm] as a light source. The emitted light is converted to a parallel light by a collimator lens and incident to the focus lens through a polarization beam splitter. Here, the numerical aperture, effective radius and focal length of the focus lens are represented by NAF, a [mm] and fF ($\approx$a/NAF), respectively. The light reflected from the disc passes through the focus lens and is introduced to a light receiving image lens by a beam splitter. A change of the reflected light amount is converted to an electric signal by a photo detector positioned near the focal point of the image lens. The numerical aperture and focal length of the image lens are represented by NAI and fI ($\approx$a/NAI), respectively. Assuming that the diameter of a light receiving plane of the optical detector is represented by D, a light focused on a $k_{th}$ layer as a target layer reflected from the target layer is imaged on the focal point of the image lens, and a spot diameter Uk' on the focal plane is given by:

$$Uk'=\lambda/NAI=\lambda \times (fI/a).$$

Next, a spot diameter $U(k\pm 1)'$ on the focal plane from the $(k\pm 1)_{th}$ layer spaced from the $k_{th}$ target layer by the inter-layer distance d is given by:

$$\begin{aligned} U(k\pm 1)' &\approx a \times m^2 d/fI \\ &= NAI \cdot m^2 d \end{aligned}$$

where m is a horizontal scaling ratio of the receiving optical system.

From the above equation, assuming that the diameter D of the photo detector is $D=Uk'=\lambda/NAI$, a detected amount In of light reflected from other layers is given by:

$$\begin{aligned} 1/10 &\geq \Sigma Ij(n=1 \text{ to } N, n\neq k)/Ik \\ &= \Sigma[\delta^2 jk \times \alpha jk \times (D/Uj^i)^2] \\ &\approx I(k-1)/Ik \\ &= \delta^2(k-1), k \times \alpha(k-1), k \times (D/U(k-1)')^2 \end{aligned}$$

where δjk represents the transmissivity of layers between the target $k_{th}$ layer and another $j_{th}$ layer, and αjk represents a reflectivity ratio.

The disc structure and optical systems are designed so as to satisfy the above equation.

Further, a minimum value bmin of the two-dimensional cycle b is set to λ/NAF, and a maximum value bmax of the same is set to be smaller than 2d×NAF.

In a light receiving optical system shown in FIG. 1, optical property functions H0(S), H1(S) of a target layer plane on which recording/reproduction is performed and an adjacent layer plane spaced therefrom by a distance are indicated by straight lines 13 and 14, respectively, in FIG. 4. S represents a normalized spatial frequency.

Now, as to the optical property function H1(S) for a case where out-of-focus occurs at the inter-layer distance d, a maximum repetition bmax of the cycle b is defined from S=2 where H1(S)=0 is satisfied. By thus defining the relationship among the cycle b of changes in the local optical properties on the layer plane, the disc structure and the light receiving optical system, inter-layer cross-talk components are made larger than the cycle b of changes in the local optical properties.

Further, a code which defines that a total area occupied by local optical changes (marks) included in the area defined by the spot diameter (2d×NAF) on an adjacent layer is constant is employed.

Further, $$dk=dF(k-1)+dMk+dFk=dMk \quad \text{(Equation 1)}$$

and the effective refractivity NMk of the intermediate layer is assumed to be equal to the refractivity NB of the substrate.

In a disc structure where a thickness d up to an $N_{th}$ layer of a multi-layer disc is given by the following equation:

$$d=\Sigma dk+d0 \quad \text{(Equation 2)}$$

a thickness dk of the intermediate layer of each layer and the total number N are combined so as to satisfy a spherical aberration amount W40 which is given by:

$$\begin{aligned} W40 &= 1/(8\times NB) \times (1/NB^2-1) \times \\ &\quad NAF^4 \times \Delta d \leq \lambda/4 \end{aligned} \quad \text{(Equation 4)}$$

$$0.5 \times \Sigma dk = \Delta d$$

Optical constants of the $k_{th}$ recording layer 1, i.e., the transmissivity, reflectivity and absorption ratio are represented by Tk, Rk and Ak, respectively. Here, the relationship Tk+Rk+Ak=1 is satisfied. The optical constants, when the local optical properties are changed by recording, are indicated by adding a dash "'" thereto. Generally, in thermal recording, to cause a change in thermal structure, an energy threshold value Eth [nJ] must exist. A light spot focused to the refractory limit on a target recording layer is scanning on the disc at a linear velocity V [m/s].

To locally cause a change in thermal structure corresponding to a modulated binary signal, a light intensity P (recording power) [mW] of the light incident to the disc should be defined. Here, given a linear velocity V and an irradiation time t, a light intensity density threshold value is represented by Ith [mW/μm²].

For a light intensity density Ik on a $k_{th}$ layer when the focus is placed on the $k_{th}$ layer, a $1/e^2$ spot area Sk when the focus is placed on the $k_{th}$ layer is given by:

$$Sk=\pi(0.5\times\lambda/2NAF)^2$$

A light intensity Pk [mW] on the $k_{th}$ layer is given by:

$$Pk = P \cdot \delta k \quad \text{(Equation 6)}$$

$$\delta k = \Pi Tn$$

where δk represents the transmissivity of layers between the light incident plane of the disc and the $k_{th}$ recording layer, and Tn represents the transmissivity of n layers.

From Equation 6, a minimum recording power Pmin required to enable recording on the $k_{th}$ layer is expressed by:

$$Pmin \geq Ik_{th} \times Sk/\delta k \quad \text{(Equation 7)}$$

Also, a light intensity density Ijk [mW] on a $j_{th}$ layer when the focus is placed on the $k_{th}$ layer for recording thereon is:

$$\begin{aligned} Pjk &= Pk \times \delta jk \\ &= P \times \delta j \\ \delta jk &= \Pi/\Pi(=\text{(transmissivity up to } j_{th} \text{ layer/} \\ &\quad \text{transmissivity up to } k_{th} \text{ layer))} \end{aligned} \quad \text{(Equation 9)}$$

An upper limit Pmax of the recording power for recording on a $k_{th}$ layer without destroying data recorded on a $j_{th}$ layer is given by the following equation:

$$Pmax=Ij_{th}\times Sjk/\delta j \quad \text{(Equation 10)}$$

where Sjk represents the diameter of a light spot on the $j_{th}$ layer when the focus is placed on the $k_{th}$ layer, $$\begin{aligned} Sjk &= \pi[(\Sigma dn) \times TAN\phi]^2 \text{ (when } j>k) \\ &= \pi[(\Sigma dn) \times TAN\phi]^2 \text{ (when } j<k) \\ &= \pi[(\Sigma dn) \times NAF]^2 \end{aligned} \quad \text{(Equation 11)}$$

where dn represents a thickness of an $n_{th}$ layer.

$$TAN\phi=a/fF=NAF$$

The focusing optics, disc structure and recording conditions are defined so as to simultaneously satisfy Equations 6, 7, 9, 10 and 11.

As a role of each layer, a disc is provided with a ROM (Read Only Memory) layer or a WOM (Write Once Memory) layer together with layers for recording and reproducing user data.

The ROM or WOM layer may be used as a management layer, and data conditions of each layer, for example, the presence or absence of data, error management, an effective data area, the frequency of overwrite are recorded thereon at any time.

Also, it may be used as a spare layer such that information is recorded thereon in place of a layer from which a recording error has been detected.

As a management format on each layer plane of the disc, sectors and tracks are provided, and recording is performed sequentially from the top layer, i.e., $1_{st} \rightarrow k_{th} \rightarrow N_{th}$ layers or from the lowermost layer, i.e., $N_{th} \rightarrow k_{th} \rightarrow 1_{st}$ layers. Note, however, that recording proceeds to the next layer after all user sectors and tracks have been filled with information in each layer.

While recording proceeds to the next layer after all user sectors and tracks have been filled with information in each layer, the order of layers to be accessed for recording is at random.

While layers to be recorded are randomly accessed, after data has been recorded in a sector of a layer, the same sector of the next layer is filled. When the same sector of all layers has been filled, data is recorded on the next sector.

On a track, random access is performed in the layer direction. In this case, a variable length block is employed, not a fixed block management based on the sector.

As a light spot positioning mechanism, a two-dimensional actuator for driving a focus lens in the layer direction and the radial direction of the disc or a combination of a one-dimensional actuator for driving a focus lens only in the layer direction and a galvano mirror for deflecting light flux in the radial direction of the disc is employed, where a layer address recorded on a preformat portion is read by a layer number detecting circuit to recognize the number of a layer on which the focus is currently being placed. Then, it is recognized in which of upward or downward direction (+ or −(k−j)) and how many layers (|k−j|) the spot should jump from the $j_{th}$ layer on which the spot is now focused to the $k_{th}$ target layer instructed by an upper level controller, and a layer jump signal generating circuit is instructed to generate a jump force signal which is inputted to an AF actuator driver.

The jump signal is composed of a pair of positive-polarity and negative-polarity pulses for a one-layer jump, and replaces the positive or negative pulse in accordance with the upward or downward jumping direction. The first pulse is used to drive the spot approximately by a jumping distance in a jumping direction, and the next polarity inverted pulse is provided to stabilize the spot so as not to excessively jump. A number of pairs of pulses equal to the number of layers over which the spot jumps is inputted to a driver circuit. Next, the layer number is detected, and j=k is recognized.

A zero-cross pulse of the AF error signal and a total light amount pulse are used as gates, and a cross layer signal detecting circuit is provided for detecting the detection of a focused point on each recording layer.

A saw-tooth wave is generated from an AF actuator shift signal generating circuit so as to shift a focus position at least from the top layer to the lower-most layer of the disc, and the AF actuator is driven by this saw-tooth wave, wherein the focal points on T layers are counted by the cross layer signal detecting circuit, and the top layer (n=1) is recognized from an upper limit of an up pulse when the lens is shifted upwardly while the lowermost layer (n=N) is recognized from a lower limit of a down pulse when the lens is shifted downwardly, thereby always recognizing the focus position in the layer direction of the disc.

When recording is to be stably performed on a target $k_{th}$ recording layer, a recording power P (light intensity) is set in consideration of the transmissivity up to the $k_{th}$ layer ($\Sigma Tn$ (n=1, 2, ..., k−1)). Also, the transmissivity up to the $k_{th}$ layer is set for recognition of the layer address.

The recording power is set by address recognition in consideration of a ratio of the transmissivity up to the $k_{th}$ layer ($\Sigma Tn$ (n=1, 2, ..., k−1)) upon shipment of the disc (or designed value) to the transmissivity up to the $k_{th}$ layer ($\Sigma Tn'$(n=1, 2, ..., k−1)) immediate before recording, i.e., a change G in transmissivity.

A management layer for layer data is provided for recording on which layer recording is being performed. The management layer is reproduced before recording on a target layer to recognize the transmissivity up to the $k_{th}$ layer ($\Sigma Tn'$(n=1, 2, ..., k−1)) immediate before recording and a change G in transmissivity.

The change G in transmissivity may be obtained by previously reproducing an area to be recorded before recording on the target layer.

As a method of previously reproducing an area to be recorded, a reproduction check is done in the first rotation of the disc in a recording mode, recording is performed in the next rotation, and then a recording error check is done in the third rotation. In this event, a plurality of spots are employed, and the reproduction check is done by a preceding spot.

The reproduction check employs a reproduced signal C'k(t−τ) reproduced by the preceding spot, where τ represents the distance between the preceding spot and a recording spot converted into a time. Here, the transmissivity change G may be calculated as a square root of a ratio of a reproduced signal Ck' in a state where the spot is focused on the target $k_{th}$ recording layer to a reproduced signal Ck as a design value which has previously been set upon shipment of the disc.

In the reproduction check, the value of the reproduced signal Ck may be recorded on a non-recording area previously provided as a check area in a disc format with respect to the layer direction on a disc plane.

As a reproduction control circuit, reflected light components from adjacent layers which particularly include a majority of inter-layer cross-talk is detected, in addition to the detection of reflected light components from a target layer, and mutually included components are removed by a calculation.

Three photo detectors are positioned on imaging planes of a target $k_{th}$ layer and the adjacent $(k+1)_{th}$ and $(k−1)_{th}$ layers on the light receiving plane side when the focus is placed on the $k_{th}$ layer. The shape of the photo detectors are selected to be a circle, the diameter D of which is given by D=(λ/NAI). Alternatively, pinholes are used to restrict light receiving areas. Then, the following calculation is performed for a reproduced signal by the photo detector on the $k_{th}$ layer, a reproduced signal C(k−1) by the photo detector on the $(k−1)_{th}$ layer, and a reproduced signal by the photo detector on the $(k+1)_{th}$ layer.

$$\begin{aligned}
\text{Calculation } F &\equiv Ck - \gamma \times C(k-1) - \\
&\quad \gamma \times C(k+1) \\
&\approx CkR + \beta \times C(k-1)R + \\
&\quad \beta \times C(k+1)R - \\
&\quad \gamma \times \{C(k-1)R + \beta \times \\
&\quad CkR + \beta \times C(k-2)R\} - \\
&\quad \gamma \times \{C(k+1)R + \beta \times \\
&\quad CkR + \beta \times C(k+2)R\}
\end{aligned}$$

where $\beta$ represents a ratio of cross-talk components included in each signal to necessary signal components.

Since $C(k-2)R$ and $C(k+2)R$ are sufficiently small and frequency components are also low, these terms can be neglected.
Thus $$\begin{aligned}
F &\approx (1 - 2\gamma\beta) \times CkR + (\beta - \gamma) \times C(k-1)R + \\
&\quad (\beta - \gamma) \times C(k+1)R
\end{aligned}$$

Here, if $\gamma = \beta < 1$,
$F \approx (1-\beta)^2 \times CkR$

By employing the calculation function given by the above equations, signal components on the target layer alone can be derived.

A plurality of spots are employed. A spot having the same spot diameter as an out-of-focus spot on the adjacent layers when the focus is placed on the $k_{th}$ layer are used to scan the two adjacent layers prior to the spot focused on the $k_{th}$ layer, to obtain reproduced signals from these layers, and the above calculation is performed.

As shown in FIG. 18, a diaphragm is inserted to reduce the effective aperture of the focus lens. Specifically, the effective diameter a' is reduced to $[\lambda/(2d \times NAF^2) \times a]$.

The optical axis is considered for three separate optical systems employing three different spots, and the numerical aperture of the focus lenses are reduced in two optical systems with preceding spots. Specifically, $NAF' = \lambda/2d \times NAF$ is given.

A reproduced signal detected by the preceding spot is multiplied with a weighting function 80 derived by approximating a Gaussian distribution, which is an intensity distribution of the spot, to a triangle distribution, and integration is performed to this product.

In a weight setting circuit for setting each calculation coefficient $\gamma$ ($\equiv \beta$), mark recording areas on at least three layers including upper and lower adjacent layers are located as a disc format such that they are not included in the same light flux, and $h(k-1)/hk$ and $h(k+1)/h$ are set to $\beta(-1)$ and $\beta(+1)$.

By employing a plurality of spots and placing the focus on each layer, recording/reproduction is performed simultaneously on two or more layers, i.e., parallel recording/reproduction is achieved.

A recording medium, the transmissivity of which is increased after recording, is employed.

Guide grooves in each layer plane of the multi-layer disc and prepits such as address are provided in a UV cured resin layer for each layer and formed by using a transparent frame for each layer by a 2P method which employs the light incident from the plane of the frame.

The intermediate layer is provided with a quarter wave plate layer.

By applying the above structure, there can be provided a three-dimensional recording/reproducing apparatus including an optical system which enables stable information recording and reproduction.

Particularly, since a photo detector in a predetermined shape is disposed on the focal plane of the optical system, when information recorded on a target recording layer is to be reproduced from among a plurality of recording layers constituting a recording medium, leak of reflected lights from other recording layers are reduced and signal components on the target recording layer alone can be detected.

A predetermined relationship is established between a recording frequency of information on a recording layer subjected to reproduction and the numerical aperture of a focus lens in the optical system, whereby cross-talk components from adjacent layers included when information is being reproduced from the target layer is limited to direct current components (of a fixed value), and signal components from the target layer alone can be extracted by removing the direct current components.

Further, spherical aberration caused by a change in optical distance from one layer to another is suppressed within a tolerable value, and a light spot at the diffraction limit can be formed on each recording layer.

Also, a recording power can be set to an incident light which allows stable recording on a target layer without destroying data on other recording layers during the recording process.

BRIEF DESCRIPTION OF THE DRAWINGS

FIG. 1, comprising

FIG. 2, comprising

FIG. 3 shows the principle of a recording system according to the present invention, where

FIG. 4, comprising

FIG. 5, comprising

FIG. 10 shows an example of a three-layer film structure and its recording characteristic, where

FIG. 17 shows an optical system for realizing the reproduction control method of the present invention, where FIG. 17A illustrates the principle of the optical system; FIG. 17B an actual optical system; and FIG. 17C the formation of a pinhole;

FIG. 18 is a diagram showing the structure of an optical system for realizing the reproduction control method of the present invention;

FIG. 24, comprising

FIG. 26 shows detection of out-of-focus in a recorded layer, where

DESCRIPTION OF THE PREFERRED EMBODIMENTS

Figure 1A:
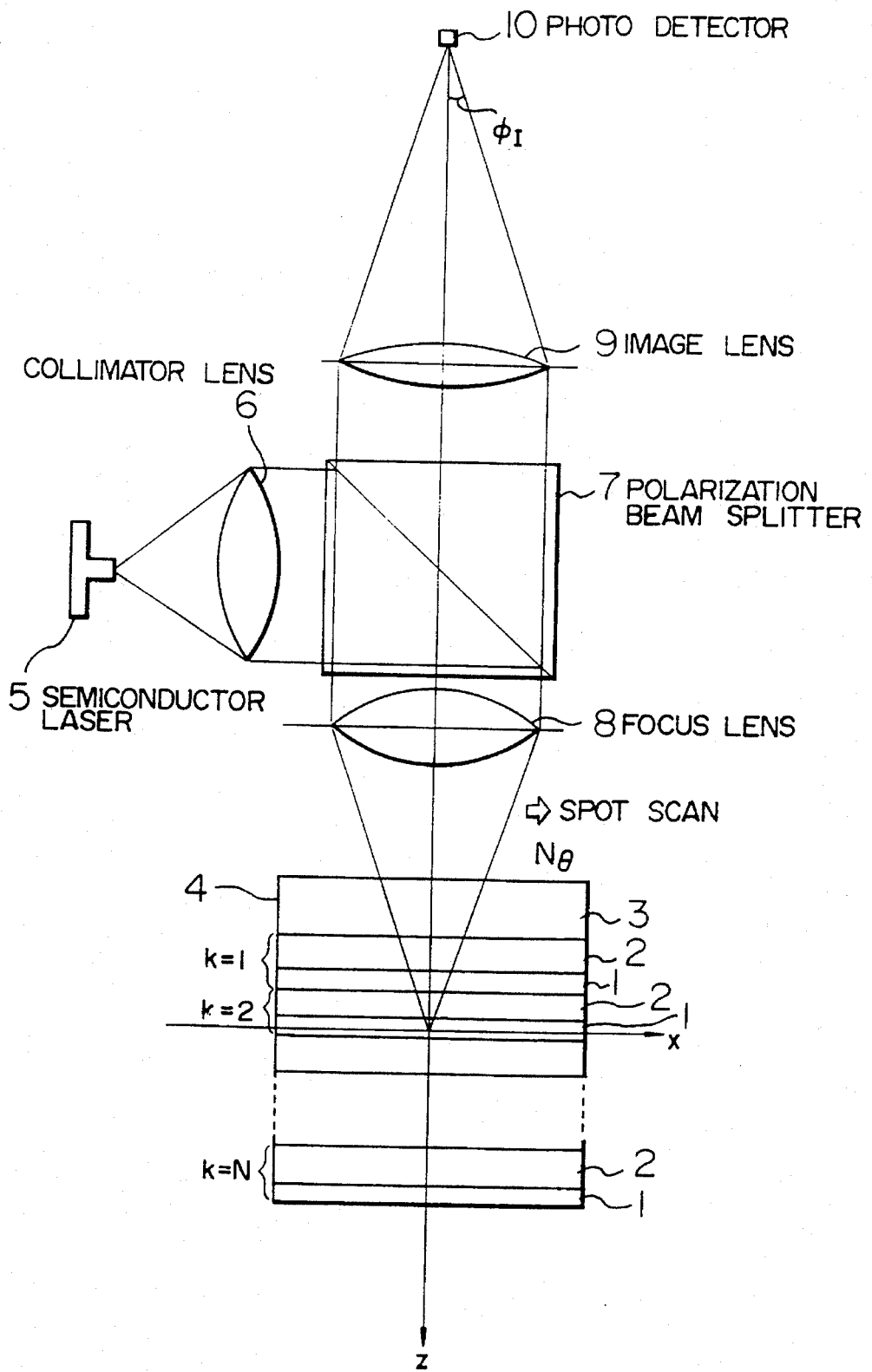
FIGS. 1A–1C, shows the principle of a recording/reproducing system according to the present invention.

Embodiments of the present invention will hereinafter be described in the following order:

(1) Principle of Three-dimensional Recording/reproducing Method;
(2) Three-dimensional Disc Format and Data Management;
(3) Structure of Apparatus;
(4) Access Method;
(5) Recording Control Method;
(6) Reproduction Control Method; and
(7) Embodiment of Disc Structure and Disc Producing Method.

(1) Principle of Three-dimensional recording/reproducing method

The principle of recording and reproduction performed by a three-dimensional recording/reproducing apparatus according to the present invention will first be explained with reference to FIG. 1. Information is recorded on and reproduced from a disc 4 in which a combination of a recording layer 1 and an intermediate layer film 2 is stacked on an optically transparent substrate 3 a plurality of times. The recording layer 1 is such that its optical properties change by a local light irradiation. The intermediate layer 2, serving as a an assistant for the recording layer 1, consists of a layer or a stack of layers provided for the purpose of reflection protection, multiplex reflection, light absorption, transfer of local optical property changes on the recording layer, heat insulation, heat generation, reinforcement and so on. A light spot focused on each layer is irradiated thereonto to two-dimensionally change the local optical properties of recording layers independently of each other. Then, recording is performed on each layer corresponding to modulated data "1" and "0," and the light spot is irradiated onto a recording layer whose optical properties have been changed to detect a change in a reflected light amount (or a transmitting light amount) to reproduce data.

Figure 1B:
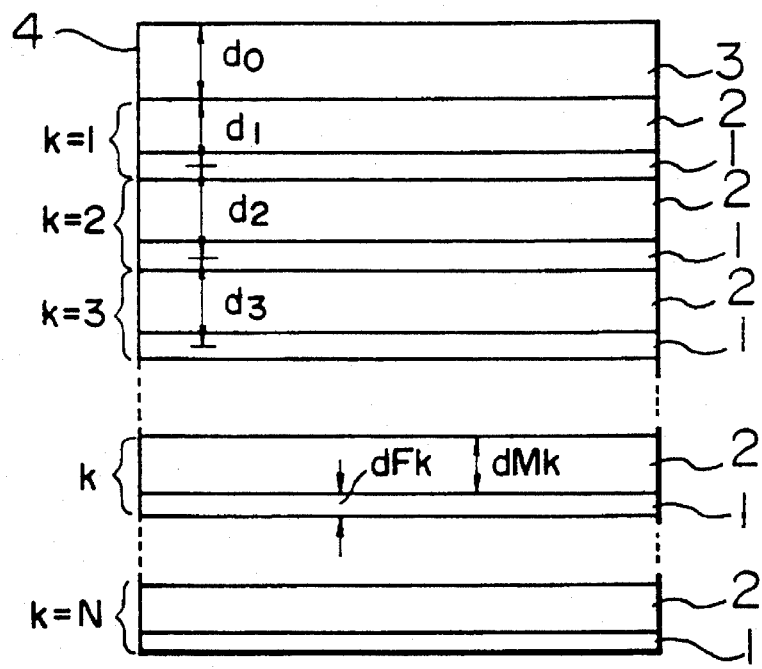

In the disc 4 shown in FIG. 1B, the refractivity and the width of the optically transparent substrate 3 are designated NB and d0, respectively. Further, the intermediate layer and the recording layer 1 are blocked as a combination of layers k, and these combinations are sequentially numbered from 1 to N from the top layer (on the light incident plane side). The distance between adjacent layers is in principle indicated by dk which is the distance between the centers of adjacent $k_{th}$ and $(k+1)_{th}$ recording film layers in the thickness direction. Further, a film thickness of an arbitrary $k_{th}$ recording layer is designated dFk; the real part of the refractivity of the same NFk; the film thickness of the intermediate layer 2 dMk; and the real part of the refractivity of the same NMk. Also, a cycle of changes in the local optical properties on the plane of each layer is designated b [µm]. A focusing optical system shown in FIG. 1A employs as a light source, for example, a semiconductor laser 5 which emits the light with wavelength $\lambda$ [µm]. The light emitted from the semiconductor laser 5 is converted to a parallel light by a collimator lens 6, and is incident to a focus lens 8 through a polarization beam splitter 7. Here, the numerical aperture, effective radius and focal length are designated NAF, a [mm] and fF ($\approx$a/NAF), respectively. A light spot 11 at diffraction limit is focused on each recording layer to be irradiated thereon.

Figure 1C:
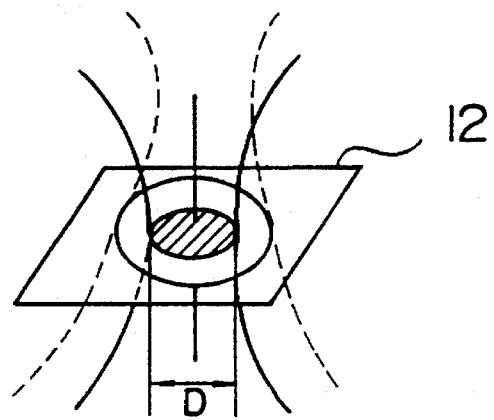

As light receiving optical system, an example of reflection light receiving system is shown. The light reflected from the disc 4 is led through the lens 8 to an image lens 9 for receiving light by the beam splitter 7. A photo detector 10 is disposed in the vicinity of the focal point of the lens 9 such that a change in a reflected light amount detected by the detector 10 is converted to an electric signal. The photo detector 10 is illustrated in FIG. 1C. The numerical aperture and focal length of the image lens 9 are designated NAI and fI ($\approx$a/NAI), respectively. Also, the diameter of a light receiving plane of the photo detector 10 is designated D (=NAI/$\lambda$).

Figure 2A:
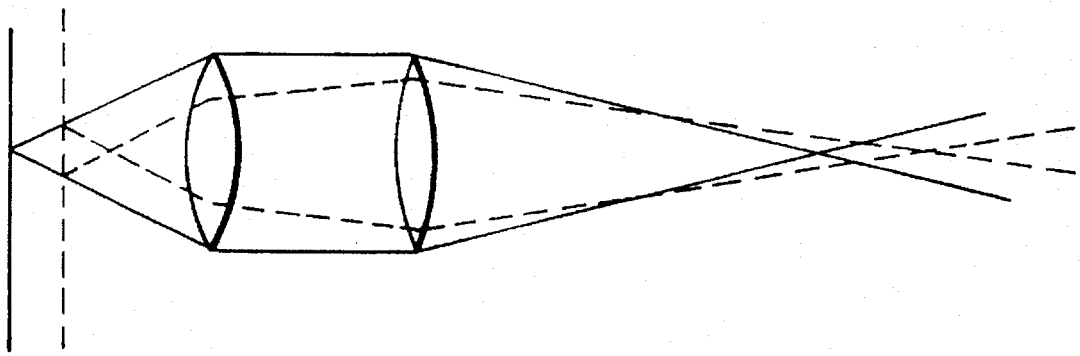
FIGS. 2A and 2B, shows the structure of basic optical system which is applied to the present invention.
Figure 2B:
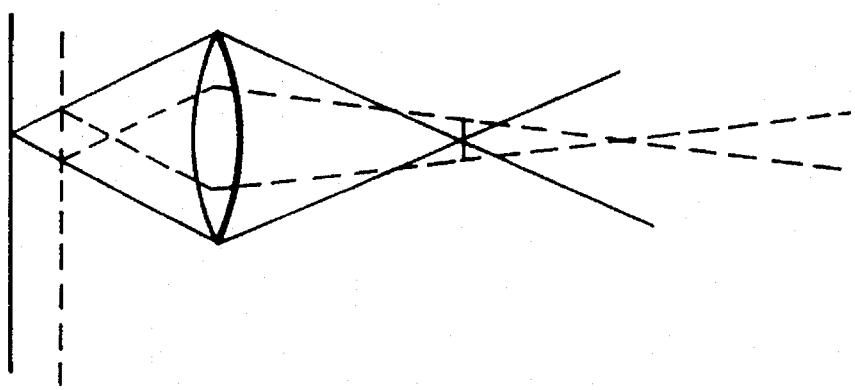

Although in this embodiment, infinite optics of FIG. 2A is shown as an example of the optical system, limited optics shown in FIG. 2B may also be used to produce similar effects. Also, as the light receiving optical system, transmitting light detecting scheme can be used to produce similar effects to this embodiment.

In the three-dimensional recording/reproduction, it is necessary for performing recording/reproduction to focus a light spot at the diffraction limit on each layer. With a conventional optical disc, a light spot is focused on a recording plane through a substrate for protecting a recording film. In this event, the focus lens 8 should be designed so as to prevent spherical aberration from occurring to distort the light spot, in consideration of the refractivity of the substrate and the thickness of the recording film.

However, in the multi-layer disc 4, the influence of layer films other than a layer to be recorded cannot be neglected. For example, as indicated in a known literature by Kubota et al, entitled "Optical Code 14, Analysis of Jitter of Eye Patterns on an Optical Disc I–V", 1985, as the number of layers other than a layer subjected to recording increases, spherical aberration also increases, which hinders the light from being focused to the diffraction limit. To solve this problem, the present invention proposes a design of a focus lens for providing a light spot having a sufficient range for recording and reproduction, and a disc structure. It is assumed for simplicity of a designing method that the film thickness dFk of the recording layer 1 is thin enough relative to the film thickness dMk of the intermediate layer 2 to be neglected. Namely, the following equation 1 is satisfied:

$$dk = dMk \quad \text{(Equation 1)}$$

Further, an intermediate layer k is assumed to have the same refractivity NB as the substrate 3. In this case, a thickness d of the disk from the light incident plane to the $N_{th}$ layer is:

$$d = \Sigma dk + d0 \quad \text{(Equation 2)}$$

On the other hand, at Rayleigh limit, a spherical aberration amount $W40 = \lambda/4$ is given as a tolerable value where 80% of a focus spot without aberration is ensured as a peak intensity.

The spherical aberration amount W40 caused by a change in film thickness $\Delta d$ from the first to $N_{th}$ layers is given by the following Equation 3:

$$WO40 = |1/(8 \times NB) \times (1/NB^2 - 1) \times NAF^4 \times \Delta d| \quad \text{(Equation 3)}$$

Thus, the design of a focus lens and the disc structure are determined so as to satisfy $W40 \leq \lambda/4$. As an example, when a glass substrate with the refractivity NB equal to 1.5 is used as the substrate 3, a UV cured resin having a refractivity substantially equal to that of glass is used as the intermediate layer, and the focal length NAF of the focus lens 8 is selected to be 0.55, $\Delta d \leq 50$ μm is derived from Equation 3. Here, by combining the thickness dk of the intermediate layer of each layer and the total number N so as to satisfy the following Equation 4:

$$d0 = 1.2 \text{ mm} - \Delta d = (1.15 \text{ to } 1.2 \text{ mm}) \quad \text{(Equation 4)}$$

$$0.5 \times \Sigma dk = \Delta d \quad (\leq 50 \text{ μm})$$

a focus lens for a substrate thickness equal to 1.2 mm used for a conventional optical disc can be used as it is to form an optical spot sufficiently usable for recording on and reproducing from each of the first to Nth layers. As a combination, with the thickness of the intermediate layer dMk=10 μm and the thickness of the recording layer dFk=200Å, do=1.15 mm, $\Sigma dk$=100.4 μm≈100 μm, and the total number N=10 are possible.

With Equation 4, spherical aberration is zero on the fifth layer, while maximum spherical aberration within the tolerable value occurs on the topmost and lowermost layers. Such spherical aberration can also be corrected. The wave optics indicates that spherical aberration can be corrected by shifting the focus position. This may be done on condition of $W40 = -W20 = -0.5 \times NAF^2 \Delta z$, and $\Delta z = -2/NAF^2 \times W40$, where W20 represents aberration due to out-of-focus, and $\Delta z$ the out-of-focus amount. In the above example, spherical aberration Wk40 occurring on the $k_{th}$ layer spaced from the fifth layer by an inter-layer distance $\Delta dk = (k-5) \times d$ is derived from Equation 3, and an out-of-focus amount $\Delta zk$ for correcting this aberration is $\Delta zk = -2/NAF^2 \times Wk40$.

On the lowermost layer (k=10), an out-of-focus amount equal to 1.4 μm may be given as an offset, and on the topmost layer (k=1), −1.4 μm may be given likewise.

A second problem for performing recording/reproduction lies in a thermal recording process. Restrictive conditions for the recording are the following two items:
<1> A sufficient and stable recording power density can be given to a target recording layer; and
<2> When recording is performed on an arbitrary $k_{th}$ layer, data recorded on other layers are not destroyed.

Factors related to these conditions are classified into those concerning the light intensity and those concerning the thermal conductivity. Here, the former factors will be described. The latter factors can be attended to by providing the intermediate layer 2 with a heat insulating effect. This method will be shown later in the paragraph describing "Embodiment of Recording Medium".

To satisfy these two items, the present invention primarily optimizes the disc structure and the focusing optical system.

Referring to FIG. 1, it is assumed for simplicity of the explanation, the substrate 2 and the intermediate layer 3 both have the transmissivity equal to 100%, by way of example. Also, optical constants of the $k_{th}$ recording layer, i.e., the transmissivity, reflectivity and absorption ratio are represented by Tk, Rk and Ak, respectively. Here, the relationship Tk+Rk Ak=1 is satisfied. The optical constants, when the local optical properties are changed by recording, are indicated by adding a dash "'" thereto. Generally in the thermal recording, the thermal structure on a recording film changes due to a temperature rise caused by a heat generated by the optical film absorbing the light and thermal diffusion occurring with thus generated heat as a heat source. This change in thermal structure corresponds to a movement of a recording film due to melting in a hole forming type recording medium; crystallization and non-crystallization in a phase change type recording medium; and inversion of vertical magnetization in a magneto-optical recording medium. This change in thermal structure may cause a change in the local optical properties. To cause the change in thermal structure, an energy threshold value Eth [nj] must exist irrespective of the kind of recording film. In a recording process, an optical spot 11 focused on a target recording layer at the diffraction limit is scanning on a disc at a linear velocity V [m/s]. To locally give rise to a change in thermal structure corresponding to modulated binary signals, the intensity P (recording power) [mW] of the light irradiated on the disc plane is modulated by a time t [s]. If the linear velocity V and the irradiation time t are given, the energy threshold value $E_{th}$ can be discussed with a light intensity density threshold value Ith [mW/μm²].

To satisfy the foregoing item <1>, the following Equation 5 may stand with respect to the light intensity density Ik on the $k_{th}$ layer when the light spot is focused on the $k_{th}$ spot:

$$Ik = Pk/Sk \geq Ik_{th} \quad \text{(Equation 5)}$$

where Ikth: Light intensity density threshold value on the $k_{th}$ recording layer (mW/μm²);
Sk: $1/e^2$ spot area when the light spot is focused on the $k_{th}$ layer: $Sk = \pi(0.5 \times \lambda/NAF)^2$
Further, the diameter of the light spot focused at the diffraction limit is represented by $\lambda/NAF$.

Figure 3A:
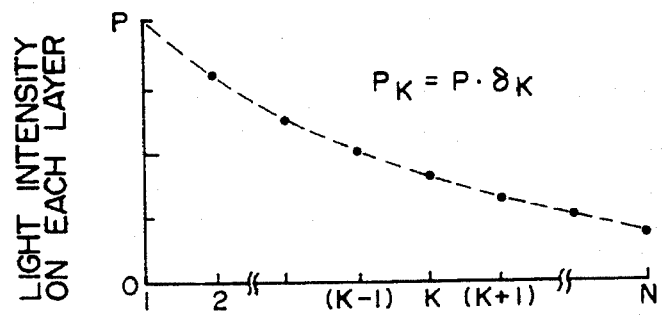
FIG. 3A is a graph showing a light intensity on each layer.

A light intensity Pk [mW] on the $k_{th}$ layer is:

$$Pk = P \cdot \delta k, \quad \delta k = \prod_{n=1}^{k} Tn \quad \text{(Equation 6)}$$

where δk represents the transmissivity of an area between the light incident plane and the $k_{th}$ recording layer of the disc, and Tn the overall transmissivity of n layers. The transmissivity Tn is as shown in FIG. 3a. From Equations 5 and 6, a minimum recording power Pmin required to record on the $k_{th}$ layer is given by Equation 7:

$$Pmin \geq Ik_{th} \times Sk/\delta k \quad \text{(Equation 7)}$$

Generally, the lowermost layer N exhibits the lowest light intensity. If a medium is such that the transmissivity Tn decreases after recording has been performed on n layers ($n=1$ to $N-1$), the transmissivity Tn is replaced by Tn' (transmissivity after recording).

To satisfy the foregoing item (2), the light intensity density Ljk [mW/μm²] on the $j_{th}$ layer when the focus is placed on the $k_{th}$ layer for recording on the $k_{th}$ layer may satisfy Equation 8:

$$Ijk = Pjk/Sjk < Ij_{th} \qquad \text{(Equation 8)}$$

$$Pjk = Pk \times \delta jk = P \times \delta j \qquad \text{(Equation 9)}$$

where $$\delta jk = \prod_{n=1}^{j} tn \Big/ \prod_{n=1}^{k} tn \ (= \text{(transmissivity of layers up to}$$

the $j_{th}$ layer)/(transmissivity of layers up to the $k_{th}$ layer).

When recording is performed on the $k_{th}$ layer, an upper limit of the recording power to avoid destroying recording contents on the $j_{th}$ layer is given by the following equation:

$$Pmax = Ij_{th} \times Sjk/\delta j \qquad \text{(Equation 10)}$$

where Sjk represents a light spot dimension on the $j_{th}$ layer when the focus is placed on the $k_{th}$ layer, and can be derived by a geometrical optics method if the inter-layer distance d is larger than the wavelength λ.

$$\begin{aligned}
Sjk &= \pi \left[(\Sigma dn) \times \text{TAN}\phi\right]^2 \text{ (when } j > k) \\
&= \pi \left[(\Sigma dn) \times \text{TAN}\phi\right]^2 \text{ (when } j < k) \\
&= \pi \left[(\Sigma dn) \times NAF\right]^2
\end{aligned} \qquad \text{(Equation 11)}$$

where dn: the film thickness of the $n_{th}$ layer; and $$\text{TAN}\phi = a/fF \approx NAF$$

Figure 3B:
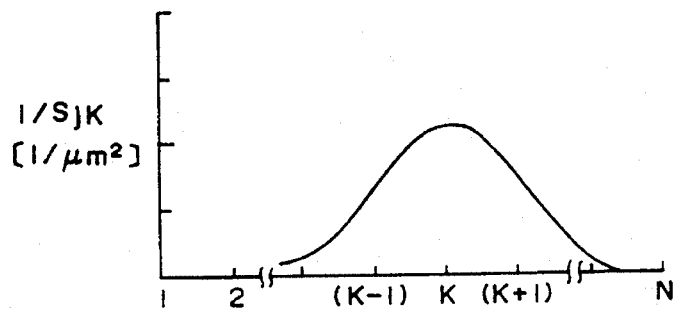
FIG. 3B is a graph showing spot plane densities on other layers when the focus is placed on a k-layer.
Figure 3C:
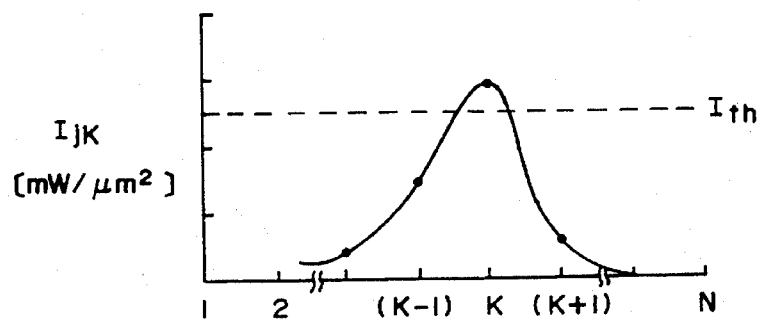
FIG. 3C is a graph showing power densities on other layers when the focus is placed on k-layer.

Here, 1/Sjk [μm²] represents an areal density which is shown as in FIG. 3B. From FIGS. 3A and 3B, the light intensity density Ijk [mW/μm²] is derived, which is as shown in FIG. 3C.

Figure 10A:
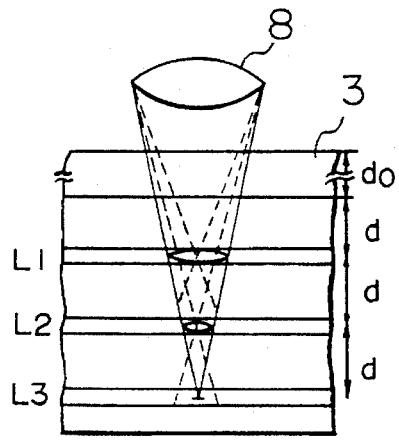
FIG. 10A is a diagram illustrating a three-layer film structure of a recording medium.

By setting the focusing optical system, disc structure and recording conditions so as to simultaneously satisfy (Equation 5) and (Equation 8), highly reliable recording can be achieved on each recording layer. As an example, a recordable inter-layer distance d is calculated for a three-layer disc shown in FIG. 10A. Note that the focusing optical system has a wavelength λ=0.78 μm and NAF=0.55, while the optical constants of each recording layer are: R1=R2=R3= 0.1; T1=T2=T3=0.8; and A1=A2=A3=0.1. Also, a linear velocity V is set to 7 m/s, an irradiation time t to 100 ns to 500 ns, and light intensity density threshold values of the recording layers at this time are set to $I1_{th}=I2_{th}=I3_{th}=2.53$ (mW/μm²). With these prior conditions, a recordable inter-layer distances d=d1=d2=d3 and a recording power range are determined.

Figure 10B:
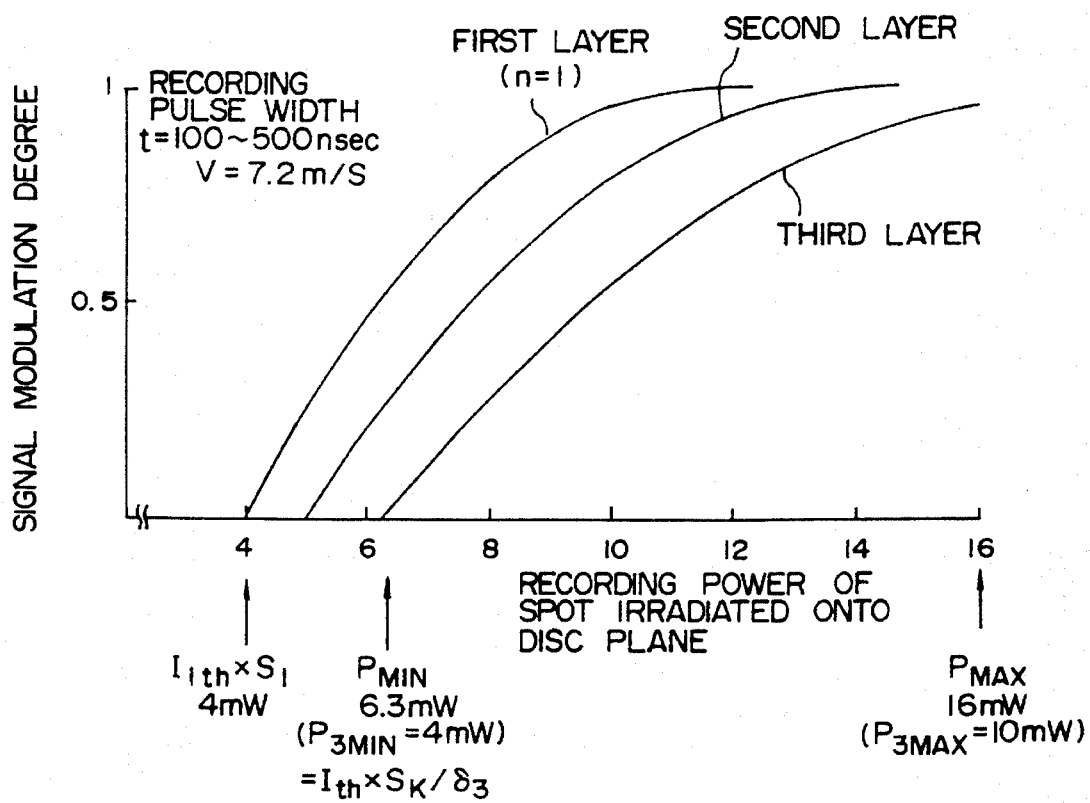
FIG. 10B is a graph illustrating the recording characteristic.

FIG. 10B shows a power of the light irradiated onto a disc and a modulation degree of a reproduced signal generated corresponding to the light power when the focus is placed on each recording layer of a disc where recording has not been performed other than on a target recording layer. The signal modulation degree indicates a standard on the size of a mark formed by a change in local optical properties on the surface of each recording layer. When the mark is large enough such as the diameter of the focus spot, the modulation degree presents a tendency of saturation. The ordinate in FIG. 10B indicates the normalized modulation degree with a saturation value being determined to be one. In FIG. 10B, a threshold value power which can form the mark is 4mW (=$I_{th} \times S1$) on the first layer, and 5mW (=$I_{th} \times S2/\delta2$) on the second layer. The power on the third layer (k=3) determines a minimum power which is calculated from Equations 5, 6 and 7:

$$\delta 3 = \Pi Tn = 0.64 \qquad \text{(Equation 12)}$$

$$S3 = \pi (0.5 \times \lambda/NAF)^2 = 1.58 \ (\mu m^2)$$

$$Pmin \geq I3_{th} \times S3/\delta3 = 6.3 \ mW$$

From (Equations 8, 9 and 11:

$$S23 = 0.95 \times d^2 \qquad \text{(Equation 13)}$$

$$S13 = 3.8 \times d^2$$

$$\delta 23 = 1.25, \ \delta 13 = 1.5625$$

$$P23 = 1.25 \times P3 = 0.8 \times P$$

$$P13 = 1.5625 \times P3 = P$$

$$I23 = 0.8 \times P/(0.95 \times d^2) = 0.842 \times P/d^2$$

$$I13 = P/(3.8 \times d^2) = 0.263 \times P/d^2$$

$$I23 < I2_{th} = 2.53$$

$$d > 0.59 \times \sqrt{Pmin} = 1.48 \ \mu m$$

For example, when d=2.5 μm, Pmax is calculated to be 16 mW (P3 max=10 mW), whereby a signal can record a sufficient mark as shown in FIG. 10B.

By thus designing the focusing optical system, data can be highly reliably recorded on a target layer without destroying recorded data on other layers.

A third problem for recording/reproduction lies in a reproduction process. Restrictive conditions for reproduction are the following items:

<3> Noise components are reduced to be minimum. Here, inter-layer cross-talk noise should be reduced.

<4> Signal components from a target layer is made maximum.

A first method for achieving the item <3> will be shown.

A first method consists of optimizing the light receiving optical system in FIG. 1. In other words, an amount of the light reflected from layers other than the target layer is made sufficiently small. Consequently, inter-layer cross-talk can be reduced, with the result that reproduction can be performed with a large S/N ratio. In FIG. 1A, a reflected light amount from a recording layer from which data is to be reproduced is all detected by the photo detector 10 disposed on the focal point of the image lens 9. This operation is now explained with reference to FIG. 1C. Unlike a reflected light from a recording layer from which data is to be reproduced, a reflected light from an adjacent layer spreads over a focal plane 12 of the image lens, as indicated by a broken line. Therefore, by restricting the size of the photo detector 10, such a reflected light from an adjacent layer can be reduced. Hereinafter, restriction of the size of the focal plane will be shown.

When the light spot 11 is focused on the $k_{th}$ recording layer as a target layer, the diameter of the light spot 11 which provides an intensity equal to a peak value multiplied by $1/e^2$, i.e., a spot diameter Uk is given by Uk=(λ/NAF). A reflected light from the target layer is imaged at the focal point of the image lens 9. A spot diameter Uk' on this focal plane 12 is given by:

$$Uk' = mUk = m \times (\lambda/NAF) = (NAF/NAI) \times (\lambda/NAF) \qquad \text{(Equation 14)}$$

where m: a horizontal scaling ratio of the light receiving optical system. Next, a spot diameter U(k±1) on the focal plane from the $(k\pm 1)_{th}$ layer spaced from the $k_{th}$ target layer by the inter-layer distance d is calculated. A distance d' between a position at which a reflected light from the $(k\pm 1)_{th}$ layer is focused by the image lens 9 and the focal plane is given by:

$$d' = Y \times d = m^2 \times d \qquad \text{(Equation 15)}$$

where Y: a vertical scaling ratio.

$$\begin{aligned} U(k\pm 1)' &= d' \times \tan\phi I = d' \times a/(fI + d') \\ &= m^2 d \times a/(fI + m^2 d) \end{aligned}$$

Here, if $fI > m^2 d$ stands, $$U(k\pm 1)' \approx a \times m^2 d/fI = NAI \cdot m^2 d \qquad \text{(Equation 16)}$$

Assuming that the diameter D of the photo detector is given by $D = Uk' = \lambda/NAI$ from the above equations, an area ratio e is calculated by $\epsilon = (D/U(k\pm 1)')^2$. Thus, the reflected light amount from the adjacent layer can be reduced, a change in reflected light amount from the target layer can be detected with a high S/N ratio as compared with a case where the diameter of the photo detector is not restricted.

Actually, a reflected light amount from another recording layer is detected in consideration of the transmissivity $\delta jk$ between the target $k_{th}$ layer and the other $j_{th}$ layer as well as a reflectivity ratio $\alpha jk$. Assuming that an inter-layer cross-talk noise amount required for a reliable signal detection is $-20$db ($1/10$), the following equation may generally be satisfied:

If a reflected light amount from n layers detected by the photo detector 10 is represented by In, $$\begin{aligned} 1/10 &\geq \Sigma Ij (n = 1 \text{ to } N, n \neq k)/Ik \qquad \text{(Equation 17)} \\ &= \Sigma[\delta^2 jk \times \alpha jk \times (D/Uj')^2] \end{aligned}$$

Note, however, that hereinafter the layer $(k-1)_{th}$ adjacent to the $k_{th}$ layer will alone be considered. Although the influence exerted by other layers may be likewise considered, the value is ignorably small.

$$\begin{aligned} \text{(Equation 17)} &\approx I(k-1)/Ik = \delta^2(k-1), k \times \alpha(k-1), \\ & k \times (D/U(k-1)')^2 \end{aligned} \qquad \text{(Equation 17.5)}$$

For example, with $\lambda = 0.78$ μm, NAF=0.55 and fI=30mm, in a case where NAI=0.075, m=7.33 and $m^2$=53.8, $D = Uk' \approx 10.4$ μm.

Given FIG. 10 as an example, from $\delta 23 = 1.25$ and $\alpha 23 = 1$, a suppression ratio is expressed by $\epsilon \times \delta^2 23 \times \alpha 23$.

$$\begin{aligned} I2/I3 &= \delta^2 23 \times \alpha 23 \times \epsilon = \delta^2 23 \times \\ & \alpha 23 \times (D/U2')^2 \\ &= \delta^2 23 \times \alpha 23 \times (\lambda/NAI)^2/(NAI \times \\ & m^2 d)^2 \delta^2 23 \times \\ & \alpha 23 \times (\lambda/NAF^2/d)^2 \end{aligned} \qquad \text{(Equation 18)}$$

If d is calculated so as to satisfy $(I2/I3) \leq 1/10$:

$$\begin{aligned} d &\geq \sqrt{(10 \times \alpha 23)} \times \delta 23 \times (\lambda NAI^2/m^2) \\ &= \sqrt{(10 \times \alpha 23)} \times \delta 23 \times (\lambda/NAF^2) \approx 12.9 \text{ μm} \end{aligned} \qquad \text{(Equation 19)}$$

While the influence of cross-talk from the second layer has been considered in this example, the influence of cross-talk from the first layer can also be calculated, however, its value $(I1/I3) = 0.024$ ($= -32$dB) is small enough to be neglected.

In the foregoing example, the diameter D of the photo detector is determined to be $D = Uk' = \lambda/NAI$, however, there is a certain degree of freedom in design, including a position shift of the photo detector, such that inter-layer cross-talk may present a certain value.

Next, a second method will be shown to achieve the item <3>.

The second method defines the relationship between a cycle b of changes (mark) in the local optical properties on a recording layer plane, the disc structure and light receiving optical system, thereby making inter-layer cross-talk components larger than the cycle b of changes in the local optical properties. Stated another way, frequency components of the inter-layer cross-talk are made smaller than a signal band of data, thereby reproducing data on the plane of a target layer with a high S/N ratio. The principle of this method will be explained with reference to FIGS. 1 and 4. Although the diameter of an optical detector is not restricted in order to distinguish the second method from the first method, the second method may be combined with the first method to provide a higher S/N ratio.

Next, the item <4> will be examined.

Since a light spot at the diffraction limit is formed on a target layer, if a two-dimensional cycle b is as long as a spot diameter ($\lambda$/NAF) on the target layer, the light spot can provide a sufficient resolution. In other words, if a minimum value bmin of the two-dimensional cycle b is set to ($\lambda$/NAF), signal components can be extracted with a sufficiently large proportion. This is a condition for satisfying the item <4>. A spot diameter on an adjacent layer, since the light spot is out of focus on this layer, is expressed by ($2d \times$NAF), where d represents an inter-layer distance, and accordingly the optical resolution is degraded. Therefore, by utilizing this characteristic, if a maximum value bmax of the two-dimensional cycle b is set to be smaller than ($2d \times$NAF), leak of signal components from the adjacent layer, i.e., frequency components of the inter-layer cross-talk becomes smaller than a signal band ($1/b$max$-1/b$min), whereby the inter-layer cross-talk can be removed by using a filter or AGC (auto gain control).

Now, the degradation of the optical resolution, i.e., the degradation of the signal modulation degree is calculated from the optical theory.

In the light receiving optical system shown in FIG. 1, optical property functions (OTF) H0(S) and H1(S) on the plane of a target layer subjected to recording and reproduction and on the plane of an adjacent layer spaced therefrom by an optical distance d [μm] are indicated by lines 13 and 14, respectively. The abscissa corresponds to a repetition frequency S of an object, while the ordinate corresponds to its modulation degree (H(S)/H(0)), where S represents a normalized spatial frequency. Namely, the following equation is satisfied:

$$S = \lambda \times fF/(2\pi a) = \lambda/NAF \times b \qquad \text{(Equation 20)}$$

The optical property function H0(S), when no out-of-focus or aberration is observed, is as indicated by a line 13. In this case, the cut-off frequency at which the optical resolution is zero is S=2. In an actual recording/reproducing apparatus, since noise components such as laser noise and amplifier noise are included and the optical system itself has aberration other than out-of-focus, it is difficult to detect the cycle b corresponding to the cut-off frequency S equal to 2. Therefore, a half of the modulation degree ($-6$dB) is determined to be a tolerable value therefor. At this time, the cut-off frequency S is 1, and a minimum repetition bmin is defined for the cycle b.

$$b\text{min} = \lambda/NAF \qquad \text{(Equation 21)}$$

On the other hand, for the optical property function H1(S) when out-of-focus, the amount of which is equal to the inter-layer distance d, occurs, a maximum repetition bmax is defined for the cycle b from S=2 at which H1(S)=0 stands.

As the out-of-focus amount d increases, the optical property function H1(S) changes in the direction indicated by an arrow 15, and bmax can also be made larger.

Figure 4A:
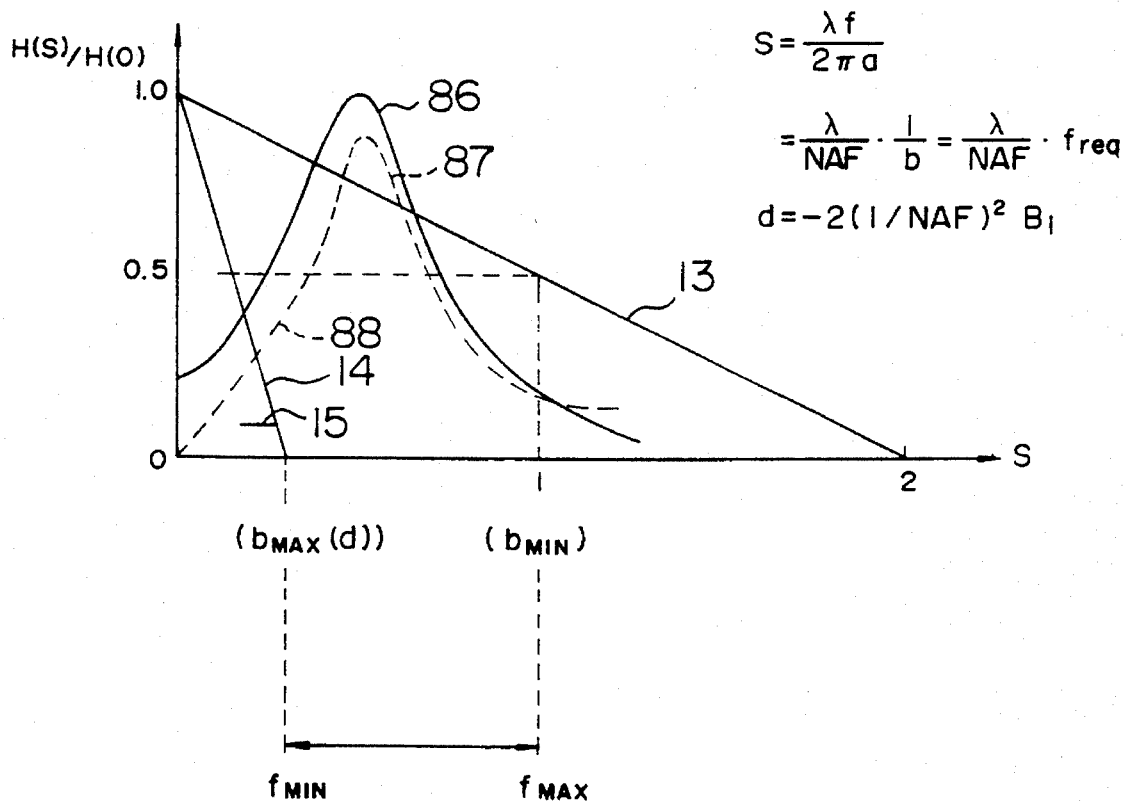
FIGS. 4A–4C, shows the principle of a reproducing system according to the present invention.
Figure 4B:
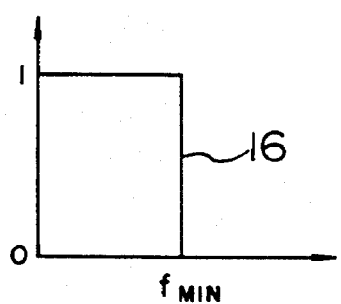

Thus, frequency components of cross-talk from adjacent layers are not more than fmin (=1/bmax), so that such cross-talk components can be absorbed by using an auto gain control circuit which has a follow-up characteristic as shown in FIG. 4B.

Some numerical examples will be shown below.

The relationship between the out-of-focus amount d and an amount B1 of wave front aberration is expressed by the following equation:

$$B1=-d/2\times(NAF)^2$$

As a numerical example, the cut-off frequency S for the out-of-focus d is calculated, and further bmax is calculated from the cut-off frequency S as follows:

When d=6.7 μm, bmax=4.7 μm; and B1=−λ

When d=10 μm, bmax=7.9 μm; and B1=−1.5λ

Also, bmin=(λ/NAF)=1.42 μm.

Figure 4C:
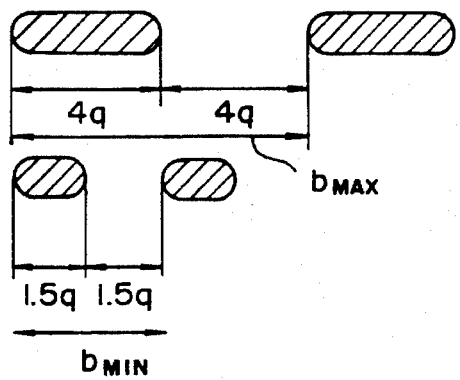

For example, when a pit edge recording method disclosed in a known patent document JP-A-63-53722 is employed for a disc where a 2–7 code, which is a variable length code, is used in the spot scanning direction, and a track pitch is constantly equal to 1.5 μm, a reproducible minimum bit pitch q (μm) and the inter-layer distance d are calculated. As shown in FIG. 4C, a minimum pattern repetition cycle is calculated as follows:

3q=bmin=1.42 μm q=0.47 μm

Here, a maximum pattern repetition length is 8q: 8q=3.76 μm≦bmax.

Also, for the cycle of marks formed in the radial direction of the disc, it is necessary that the track pitch is 1.5 μm (constant) and 1.5 μm≦bmax is satisfied. Therefore, d≧5 μm is sufficient.

Next, a third method will be shown for achieving the foregoing item (3). Although in the second method, the frequency components of inter-layer cross-talk noise are fmin or less, signals from a target layer suffer from fluctuations due to variations in local optical property change in certain modulation methods. The 2–7 modulation code employed in the foregoing example is also one of such cases. The power spectra characteristic of this modulated signal is shown in FIG. 4A. It can be seen from FIG. 4A that the signal has slight components below fmin. These components can be suppressed by a filter circuit and an AGC circuit, as described above. Even without these circuits, however, inter-layer cross-talk noise can be suppressed by removing variations in local optical property change and making direct current components constant. The principle of the third method is based on the employment of a code which defines that a total area occupied by local optical changes (marks) included in the area defined by the spot diameter (2d×NAF) on an adjacent layer is constant. By employing this code, an amount of inter-layer cross-talk included in a reproduced signal when scanning a spot presents a constant value in direct current. The third method may be used together with the first method.

An example will be shown. A power spectra 87 of a modulated signal when employing an EFM (Eight to Fourteen Modulation) modulation method described in a known literature "Digital Audio", pp 322–324, by Toshitada Doi and Akira Iga, presents a feature that the spectra of low range components abruptly falls as shown in FIG. 4A. Therefore, the inter-layer distance d may be set such that a turning point 88 from which the spectra abruptly falls coincides with the cut-off frequency at which the optical property function H1(s) becomes zero in an adjacent layer.

For example, assuming that q=0.6 μm, 2.82q= 1.7μm≧bmin=1.42 μm, and 10.36q=6.2 μm≦bmax, where the repetition cycle at the turning point 88 is 24 μm, and the inter-layer distance d is 22 μm. At this time, an occupying ratio of marks included in an area defined by the spot diameter (2d×NAF=24 μm) on the adjacent layer is maintained to be approximately 50%, whereby components of a reflected light amount from the adjacent layer included in a detected reproduced signal always presents a constant value.

Figure 21:
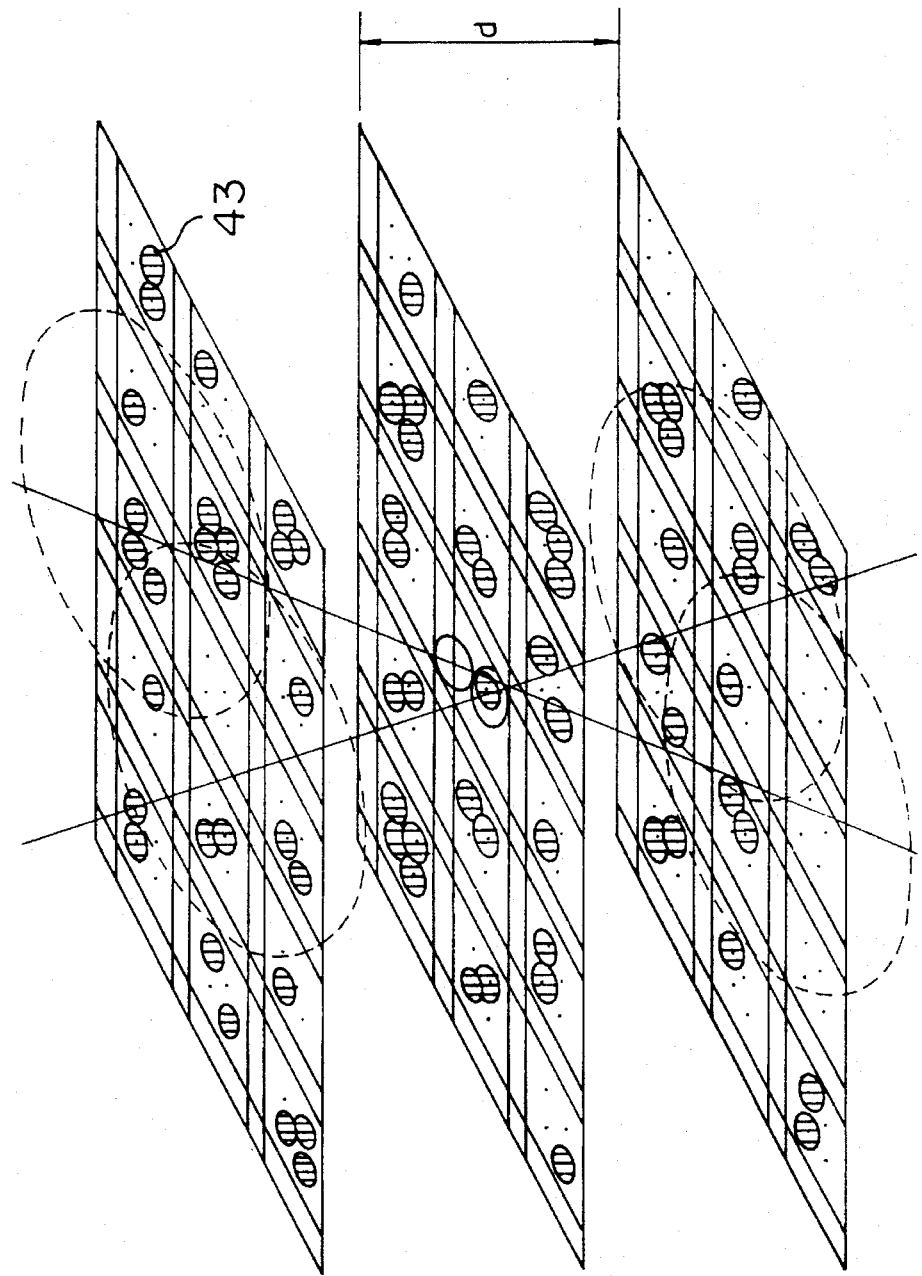
FIG. 21 shows a disc structure to which a two-dimensional recording/reproducing method is applied.
Figure 22:
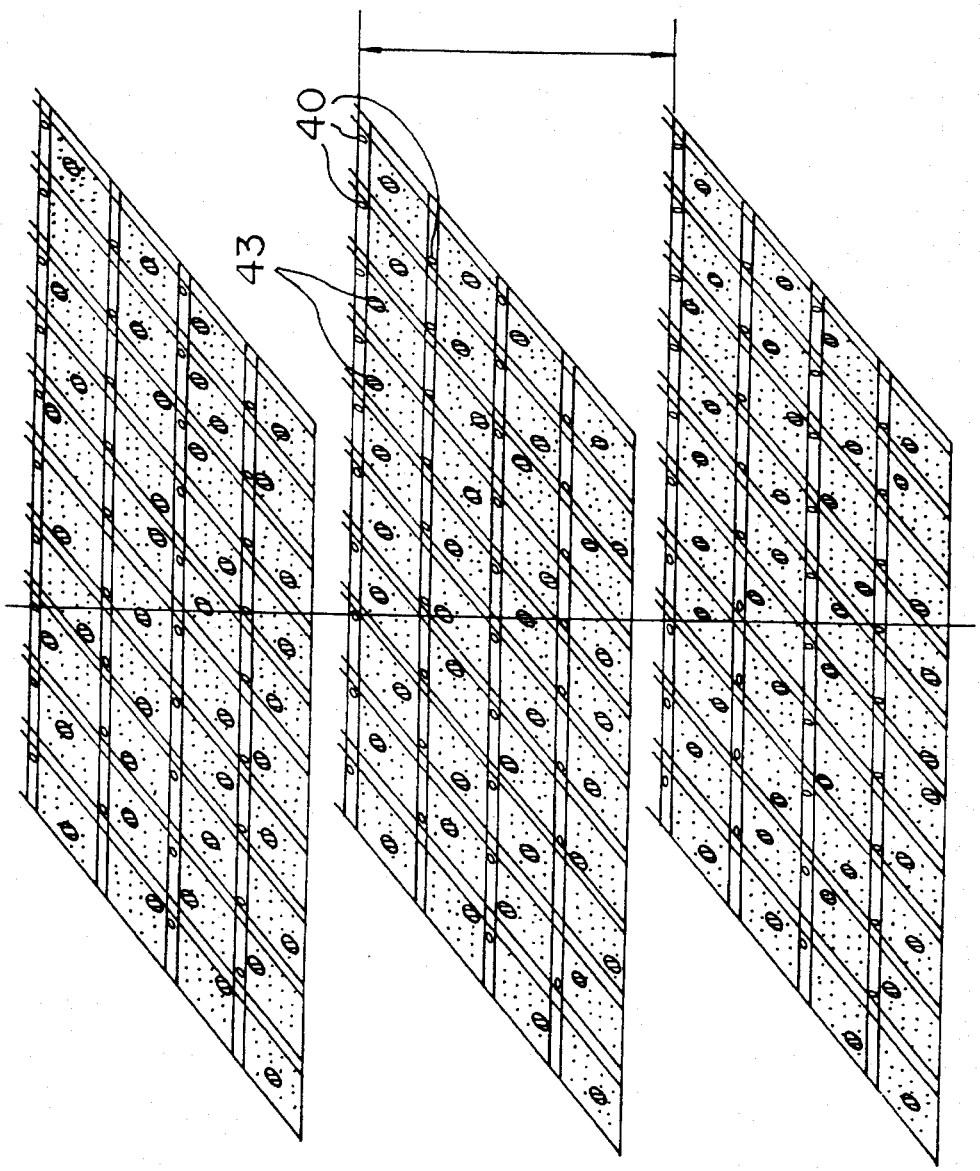
FIG. 22 shows another disc structure to which a two-dimensional recording/reproducing method is applied.

In FIGS. 21 and 22, the present invention is applied to a case where two-dimensional recording is performed within layer planes. As shown in FIG. 21, the two-dimensional recording/reproducing method employs, for example, four points arranged in a 2×2 lattice as one block to represent $2^4$=16 data by a combination of four bits which are marks on the four lattice points, thereby achieving high density recording. The two-dimensional recording can be implemented by the first and second methods. Further, as shown in FIG. 22, it is required that the same number of marks (one in FIG. 22) is included in lattice points within each 4×4 lattice block. If more lattice blocks are included in the spot area (2d×NAF) on an adjacent layer, the number of marks included in the spot and accordingly the area occupied by the marks are substantially constant, whereby the third method can be applied thereto.

Incidentally, in an optical disc, a light spot at the diffraction limit is formed on the plane of each recording layer. In each optical system shown in FIG. 2, if an out-of-focus of a certain value dm occurs, conditions of a focusing system of a microscope are satisfied, whereby an image on a recording layer plane may be formed on a light receiving plane. For example, when a target layer receives light formed into a spot at the diffraction limit, and a distance from the target layer to another layer is dm, a mark string pattern on this target layer is formed on the light receiving plane, whereby cross-talk noise in a signal band may be added to information signals on the target layer. It is therefore desirable to design the disc structure such that the inter-layer distance does not coincide with dm.

Also, since recording layers are irradiated with the same light, if the inter-layer distance is as short as an inteferable distance, lights reflected from the respective recording layers interfere with each other. As a result, cross-talk noise between layers cannot be expressed by a ratio of a received light amount on the target layer to a received light amount on other layers on the light receiving planes. Stated anther way, since interference occurs, inter-layer cross-talk noise appears in the form of the square root of the received light amount ratio in the worst case. It is between adjacent layers when this influence actually causes problems.

Figure 27:
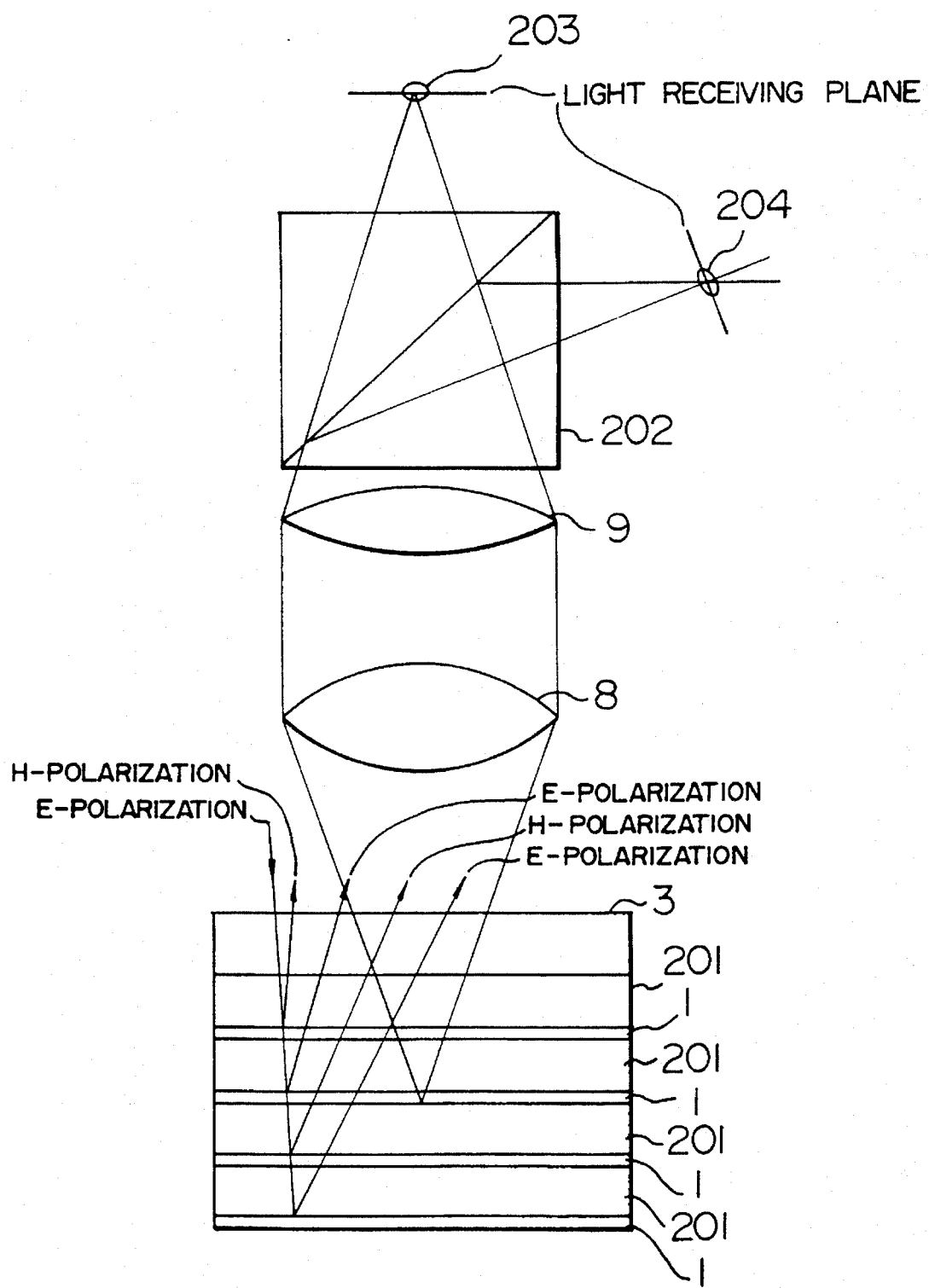
FIG. 27 is a diagram for explaining a method of reducing interference of reflected lights between adjacent layers according to the present invention.

An embodiment intended to solve this problem is shown in FIG. 27. The principle of this embodiment lies in that the polarization direction of the light reflected from an adjacent layer is changed to prevent interference. As a means for changing the polarization direction, a disc shown in FIG. 27 is provided with a wave plate layer 201 in each intermediate layer 2. A quarter wave plate layer 201 deviates the phase difference of waves in an electric field generated by travelling lights by an angular distance of 90° with respect to the depth direction of the layers. Stated another way, the difference in optical thicknesses in two directions is changed by a quarter wavelength portion. By providing a disc with such a structure, assuming that the polarization direction of an emitted light is E-polarization, lights reflected from layers adjacent to each other are different in phase by a difference produced by reciprocating the quarter wave plate layer, i.e., a half wavelength or a 180°-phase portion, whereby the polarization direction crosses alternately with E-polarization and H-polarization. For this reason, reflected light components between adjacent layers do not interfere with each other, so that cross-talk noise between these layers can be expressed by a simple received light amount ratio on the light receiving plane, with the result that cross-talk between layers can be reduced. Further, a polarization beam splitter 202 is inserted in the optical system, as shown in FIG. 27, to separately employ detector 203 or 204 depending on the polarization direction of a reflected light. Since this structure prevents a reflected light from being detected from adjacent layers, a tolerable value for variations of the size of the optical detectors can be set to a larger value in the foregoing first reproduction method.

Next, description will be made as to an apparatus for achieving the principle of the three-dimensional recording/reproducing method of the present invention shown in the foregoing section (1).

(2) Three Dimensional Disc Format and Data Management

Figure 5A:
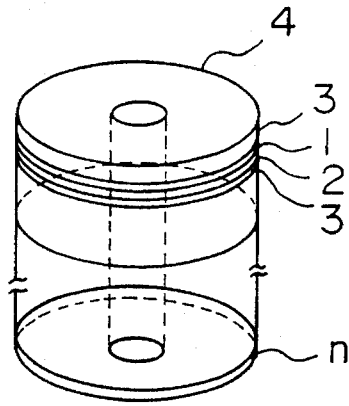
FIGS. 5A–5C, is a diagram showing a disc format according to the present invention.
Figure 5B:
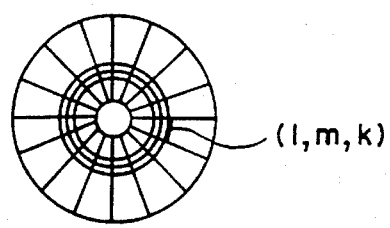
Figure 5C:
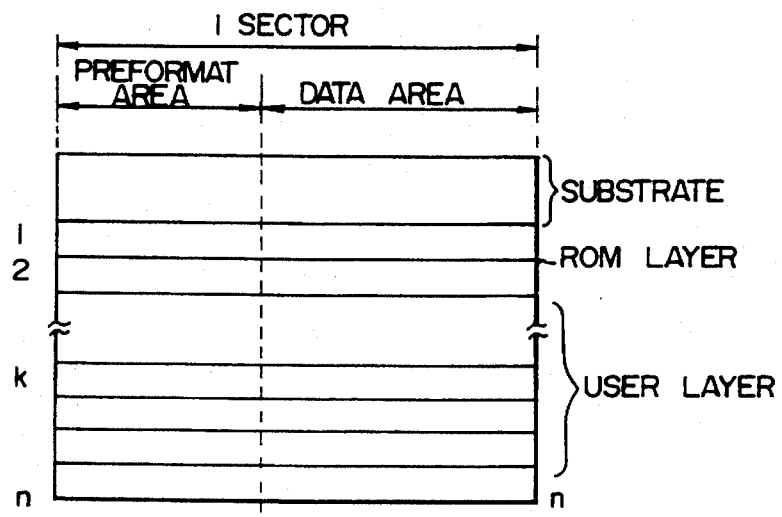

FIG. 5A shows an exemplary format of the multi-layer disc 4. The layers are numbered from 1 to n from the base 3 to which the light is incident toward the progressing direction of the light. FIG. 5B shows a dada format on a $k_{th}$ layer, where m represents a sector which radially divides the disc, and l represents a track for managing a data position in the radial direction. Data is managed by the three addresses (l, m, k). The format on an arbitrary track l and a sector m comprises a preformat area in which a timing for recording/reproduction and address information have previously been stored, and data area for recording/reproducing user data and recording and managing a variety of management data such as the presence or absence of data, read-out inhibition, and so on, as shown in FIG. 5C. The disc is also provided, in addition to the layers for recording/reproducing user data, with a ROM (Read Only Memory) layer or a WOM (Write Once Memory) layer which permits an OS (Operating System) of an upper level controller or recording or reproduction conditions on each layer, as will be later described, to be preformatted upon producing the disc or recorded thereon at the time of shipment. Also, as a management layer for data written on the user layers, data conditions of each layer, e.g., the presence or absence of data, error management, an effective data area, and the frequency of overwrite may be recorded on the ROM layer at any time. It may also be used as an exchange layer such that data can be recorded thereon and reproduced therefrom in place of a layer where a recording error is detected.

The order of data recording includes, for example, the following combinations (a)–(e).

(a) Recording is perform sequentially from the top layer, i.e., $1_{st} \rightarrow k_{th} \rightarrow N_{th}$ layers. It should be noted that recording proceeds to the next layer after all user sectors and tracks have been filled with information in each layer.

When this type of data-recording is performed, a recording medium which has the characteristic of increasing the transmissivity after recording may be used to carry out further reliable recording/reproduction. Specifically, since the transmissivity up to the lower-most layer increases, light with an intensity substantially equal to that necessary to record on the top layer can provide a lower target layer with a sufficient light intensity required for recording thereon. Also upon reproduction, since reflected light components from the target layer returns to the detector substantially without being attenuated, a reproduced signal with a high SN ratio is generated. A recording medium having the above-mentioned characteristic is, for example, a perforation recording medium. When recording is performed on this medium, a reflection layer thereof is perforated, thereby decreasing the reflectivity, i.e., increasing the transmissivity.

(b) Recording is performed sequentially from the lowermost layer, i.e., $N_{th} \rightarrow k_{th} \rightarrow 1_{st}$ layers. The rest of the operation is the same as the order (a).

(c) Although recording proceeds to the next layer after information has been recorded on all user sectors and tracks of each layer, a layer to be recorded is accessed at random.

(d) Although layers to be recorded are accessed at random, after data has been recorded on a particular sector in a layer, the same sector in the next layer is filled with data. After the same sector in all the layers has been full, data is recorded on the next sector.

(e) On a particular track, random access is performed in the layer direction. In this case, a variable length block, which is a data management for magnetic disc, not a fixed block management based on the sector, is applied to correspond cylinders of a magnetic disc to the layers, whereby a data format for the magnetic disc can be applied as it is to the recording medium of the present invention.

In the random access, the information recording area is managed by an upper level controller or the foregoing management area, for example, so as to prevent a recorded area from being erroneously accessed upon recording.

(3) Whole Arrangement of Apparatus

Figure 6:
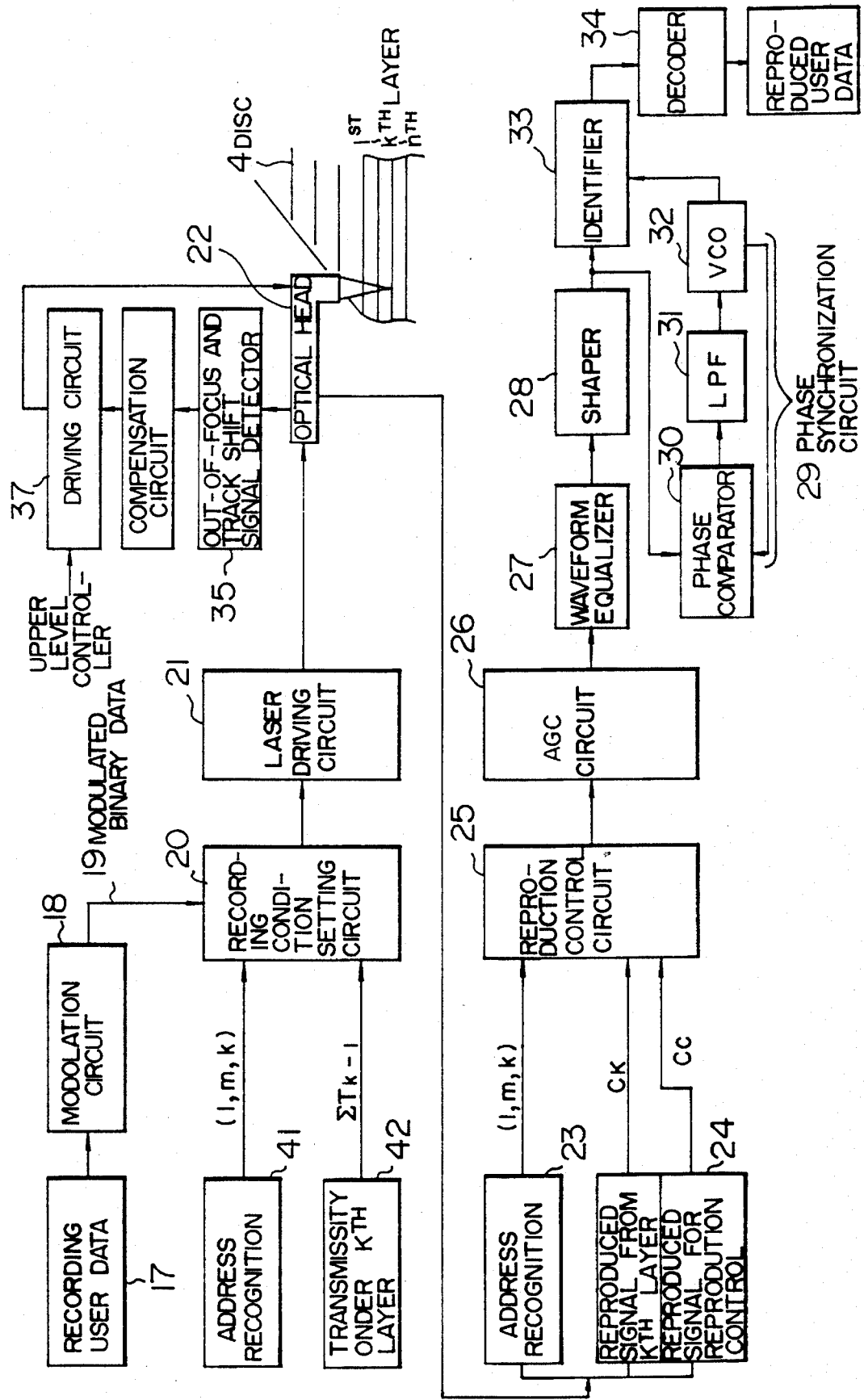
FIG. 6 is a block diagram showing the whole arrangement of a three-dimensional recording/reproducing apparatus according to the present invention.

FIG. 6 shows the whole arrangement of a three-dimensional recording/reproducing apparatus. When recording, user data 17 is supplied to a modulation circuit 18 to generate modulated binary data 19. The modulated binary data 19 is passed to a recording condition setting circuit 20 which drives a laser driving circuit 21 so as to modulate the intensity under optimal recording conditions at a position at which a light spot is positioned. Then, the laser driving circuit 21 modulates the intensity of light emitted from a semi-conductor laser disposed in an optical head 22 to record user data on a disc 4.

Conversely, when previously recorded data is reproduced, a light spot is located at a track position on a target recording layer on the disc 4, a feeble light is irradiated thereon, and an intensity change of a reflected light is converted by a photo detector 10 to an electric signal to generate reproduced signals 23, 24. The reproduced signals 23, 24 are passed through a reproduction control circuit 25 to suppress inter-layer cross-talk, and then supplied to an AGC (auto gain control) circuit 26 to absorb fluctuations of low frequency components which are lower than a data band to conform the signals to an absolute level which is processed by subsequent circuits.

Thereafter, the reproduced signals are passed to a waveform equalizer 27 to correct distorted waveform (deterioration of amplitude, phase shift, etc) by using a data pattern, and converted to binary signals by a shaper 28. The shaper 28 may be one which converts a signal to a binary code by slicing the amplitude, or one which detects zero-cross by differentiation.

The binary signals are next passed to a phase synchronization circuit 29 where a clock is extracted therefrom. The phase synchronization circuit 29 is composed of a phase comparator 30, a low pass filter (LPF) 31 and a voltage control oscillator 32. The binary signals are passed to an identifier 33 which determines whether a data bit is "1" or "0" by using the clock extracted by the phase synchronization circuit 29, and converted to user data 17 by a decoder 34. In the foregoing recording/reproducing processes, if the light spot is located on a target layer and at a target position on the target layer by an instruction from an upper level controller, an out-of-focus signal and a track shift signal from the optical head 22 are detected by a detector 35, an appropriate signal for servo control is generated by a compensation circuit 36, and a light spot positioning mechanism is driven by a driving circuit 37.

(4) Access Method

The optical spot positioning mechanism may be a two-dimensional actuator which drives a focus lens in the layer direction and the radial direction of the disc or a combination of a one-dimensional actuator which drives the focus lens 8 only in the layer direction and a galvano mirror for deflecting light flux incident to the focus lens 8 to the radial direction of the disc.

Figure 24A:
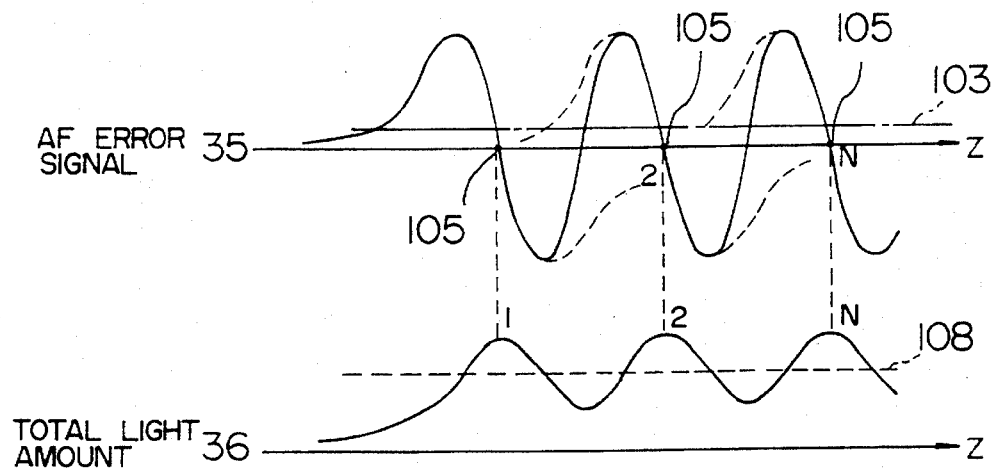
FIGS. 24A–24C, shows a concept of how out-of-focus is detected in each recording layer.

Here, for a case where random access is performed to record and reproduce data, as described in Section (2), a method of firstly focusing on a target layer k will be described. Since the size of a reflected light spot from the target layer changes due to out-of-focus, a detection of an out-of-focus signal can employ a front-to-rear differential out-of-focus detecting method disclosed in a known document "JP-A-63-231738 and JP-A-1-19535." FIG. 24A shows an AF error signal 35 generated when the position of the focus lens 8 is shifted in the layer direction Z with respect to the disc plane. It can be seen from FIG. 24A that an out-of-focus error signal from each recording layer and a zero-cross point 105 which represents a focused point are generated in order.

Figure 23:
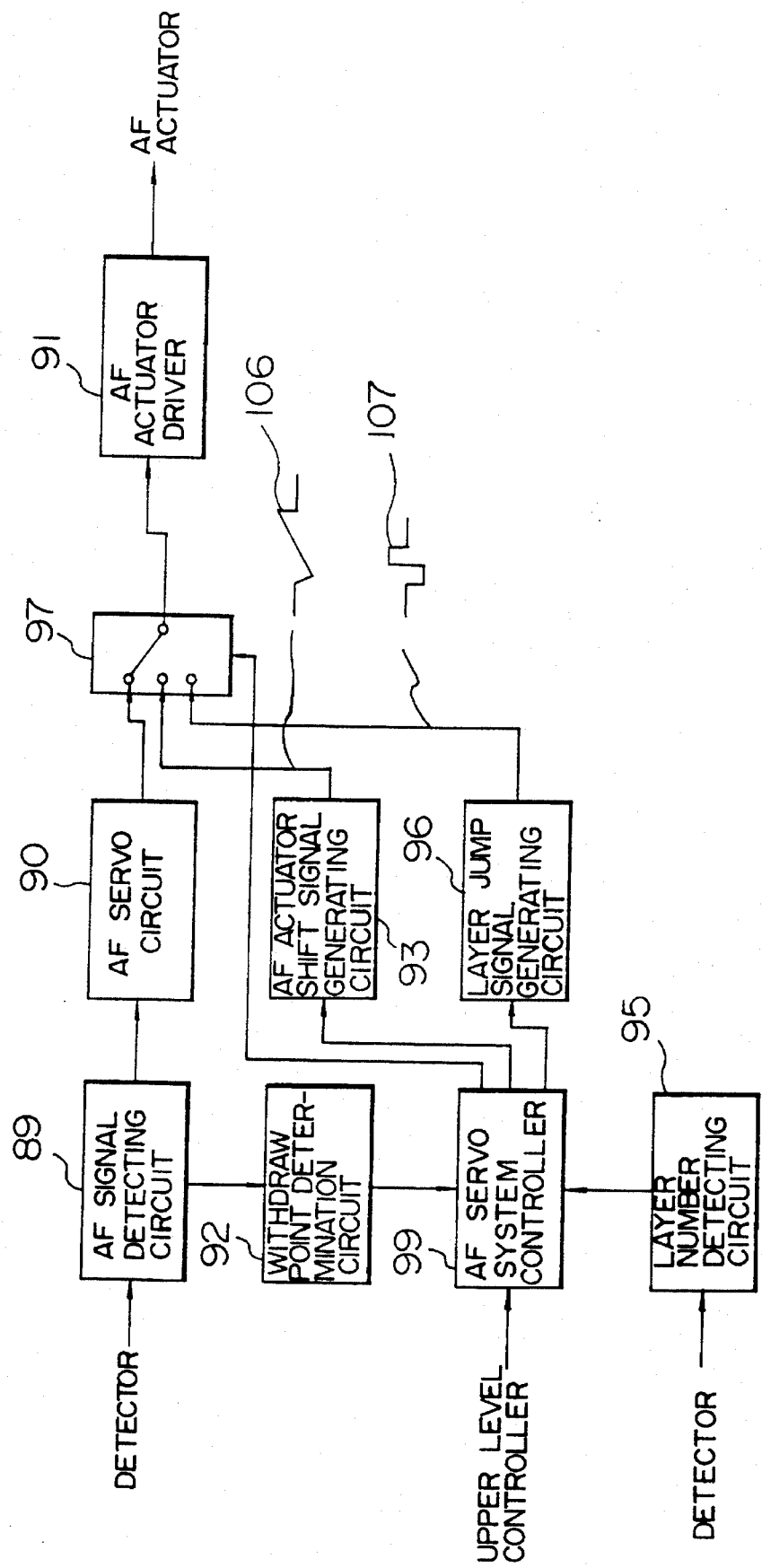
FIG. 23 is a block diagram for explaining a layer access in the present invention.
Figure 24B:
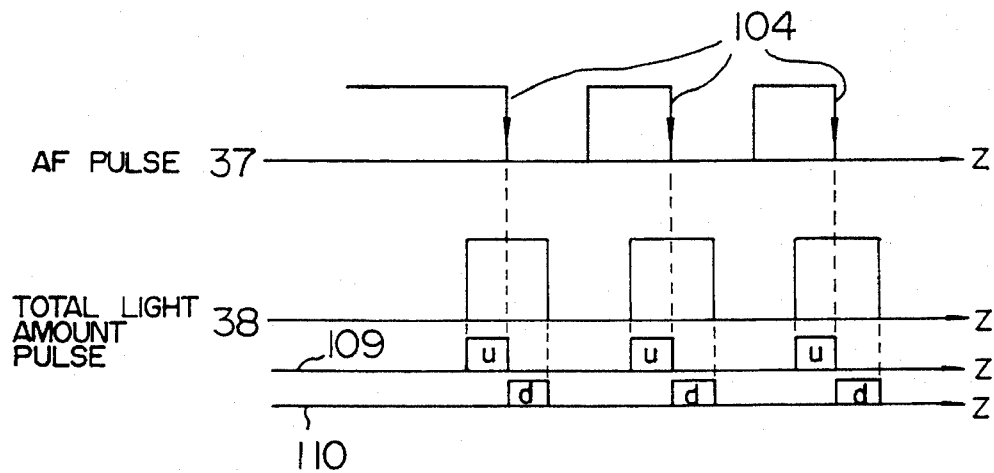

FIG. 23 shows a block diagram of the first embodiment when a target $k_{th}$ layer is accessed. For the rotating disc 4, a saw-tooth wave 106 is generated by an AF (autofocus) actuator shift signal generating circuit 93 to drive an AF actuator driver 91, thus shifting the focus lens 8 in the +Z direction (direction in which the lens is approached to the disc) with respect to the disc plane. At this time, an AF detecting circuit 89 generates the AF error signal 35. From this signal, the zero-cross point 105 is detected by a withdraw point determination circuit 92, thereby informing an AF servo system controller 99 of a focused point on the surface of a certain recording layer. The determination circuit generates an AF pulse 37 as shown in FIG. 24B by a slice level 37 which is slightly shifted from a zero slice level, and a falling edge of the AF pulse 37 is detected to supply the controller 99 with a timing immediately before the lens 8 passes a focused point.

The controller 99 recognizes a focus withdraw state by an instruction from the upper level controller, and changes over a switch 97 at the time the timing is inputted to connect an AF servo circuit 90 to the AF actuator driver 91 to close the servo loop. In this state, the AF servo circuit 90 drives the AF actuator such that the AF error signal is always zero. Thus, a spot at the diffraction limit can be stably formed on a layer even if the disc 4 swings when rotating.

Next, a layer number detecting circuit 95 reads a layer address recorded on the preformat area shown in FIG. 5C to recognize the number of a layer on which the focus is placed, and sends the number to the AF servo system controller 99. The controller 99 recognizes in which of upward or downward direction (+ or − (k−j)) and how many layers (lk−jl) the spot should jump from a $j_{th}$ layer on which the spot is now focused to a $k_{th}$ target layer instructed by the upper level controller, and has a layer jump signal generating circuit 96 generate a jump force signal 107 which in turn is inputted to the AF actuator driver 91. The jump signal 107 is composed of a pair of positive-polarity and negative-polarity pulses per one-layer jump, and replaces the positive or negative pulse in accordance with the upward or downward jumping direction. The first pulse is used to drive the spot approximately by a jumping distance in the jumping direction, and the next polarity inverted pulse is provided to prevent the spot from excessively jumping. A number of pairs of pulses equal to the number of layers over which the spot is to jump is inputted to the driver 91. Next, the layer number is detected, and when j becomes equal to k, the spot is positioned on the $k_{th}$ target layer. When another layer is to be accessed by random access, the layer jump may be executed similarly to the above.

Figure 25:
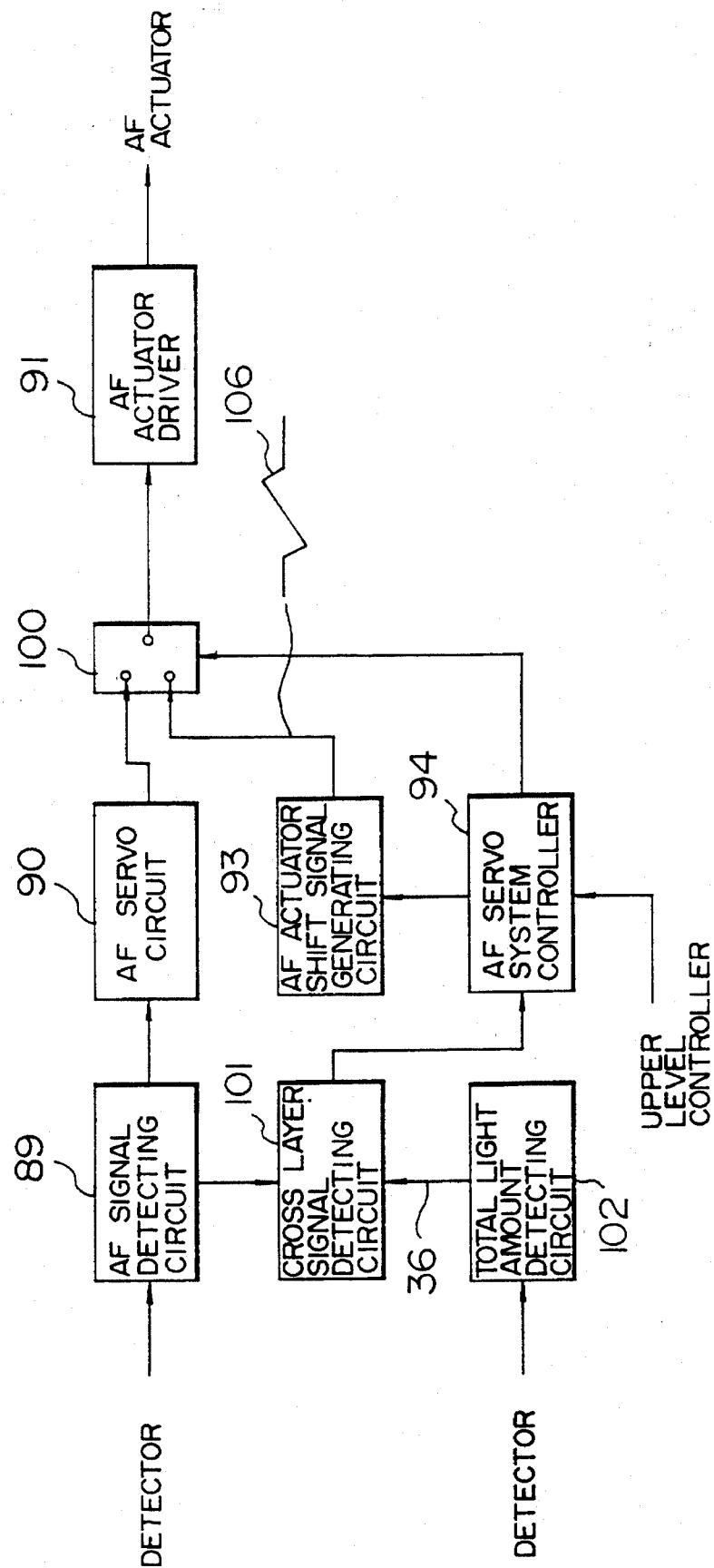
FIG. 25 is a block diagram for explaining a layer access in the present invention.

FIG. 25 shows a block diagram of a second embodiment when a $k_{th}$ target layer is accessed.

A focus lens 8 is raised or lowered relative to a rotating disc 4. At this time, the foregoing AF error signal is generated. Also, a total light amount 36 detected by a photo detector 10 and outputted from a total light amount detecting circuit 102 has a peak value when the focus is placed on each recording layer, as shown in FIG. 24A. Therefore, a pulse generating circuit 98 in a cross layer signal detecting circuit 101 detects an AF pulse 37 and a total light amount pulse 38 by slice levels 103, 108, and the total light amount pulse 38 is used as a gate to detect falling edges of the AF pulse, thereby further reliably detecting a focused point. Moreover, to recognize the direction in which the lens is shifted relative to the disc, the cross layer pulse generator 99a generates from these two kinds of pulses an up pulse Pa 109 and a down pulse Pb 110 which are counted to always recognize on which layer the lens is located.

In FIG. 25, a saw-tooth wave 10b is generated from the AF actuator shift signal generating circuit 93 to shift the AF actuator, resulting in shifting a focused position from the top layer to the lowermost layer of the disc. At this time, if a shifted amount is sufficiently larger than a vertical swinging amount of the rotating disc, the operation of the AF actuator is ensured. Focused points on N layers are counted by the cross layer signal detecting circuit 101, and the top layer (n=1) and the lowermost layer (n=N) are recognized from an upper limit of the up pulse 109 when the lens is shifted upwardly and a lower limit of the down pulse 110 when the lens is moved downwardly, respectively. A switch 100 is changed over by an instruction from the upper level controller immediately before the focus is placed on the next target layer to close the servo loop. Such a control allows layers to be accessed without providing a layer address.

Figure 24C:
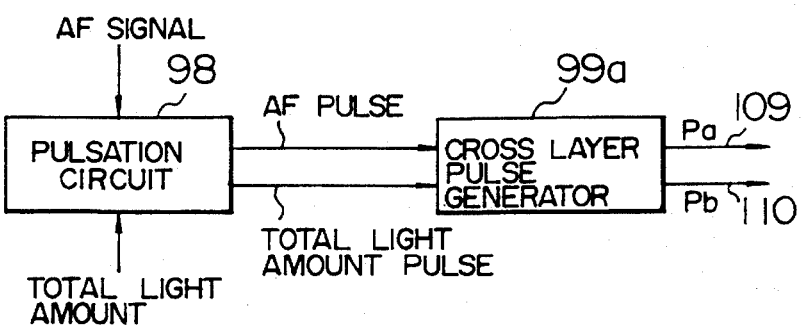
Figure 26A:
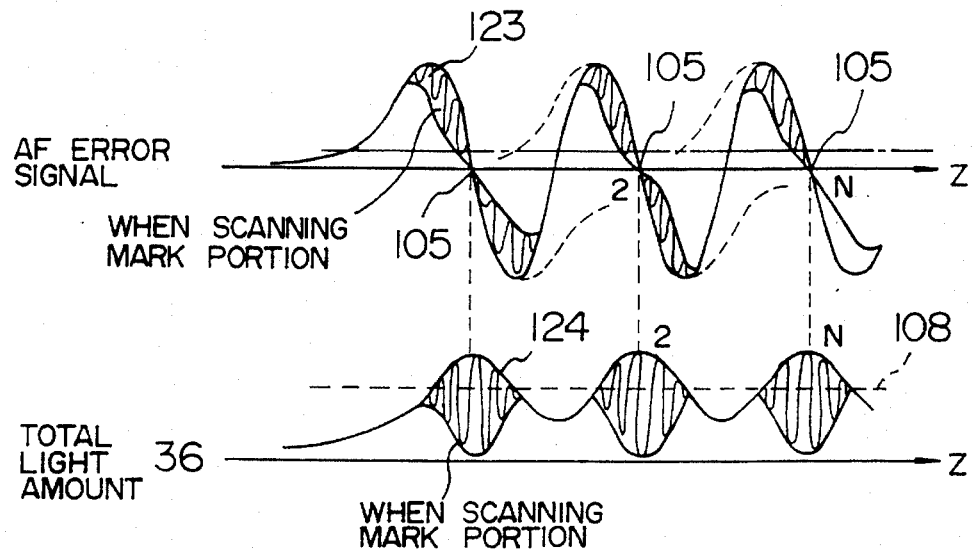
FIG. 26A is a graph illustrating a signal indicative of an out focus on a recorded layer.
Figure 26B:
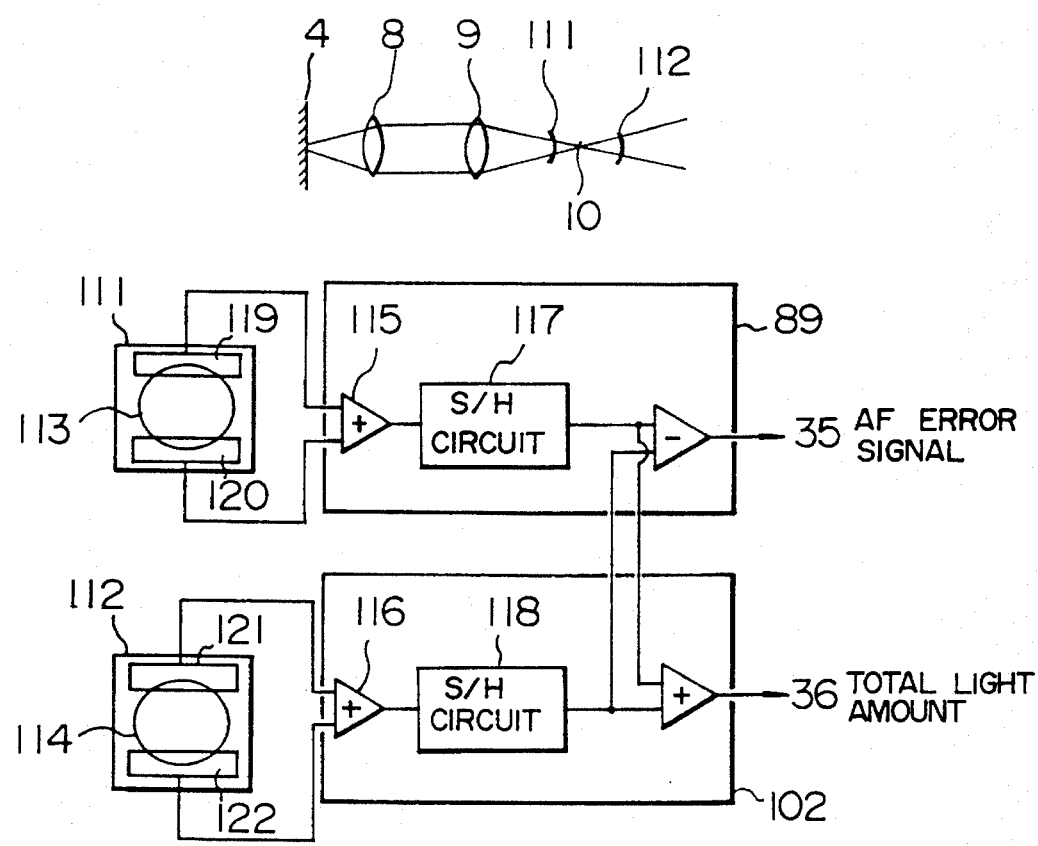
FIG. 26B is a block diagram illustrating an out-of-focus detecting circuit.

Incidentally, when using a medium whose transmissivity and reflectivity change upon recording information, the AF error and total light amount signals 123, 124 are different from those shown in FIG. 24 in the vicinity of a recorded layer as shown in FIG. 26B. This indicates that a light amount changes when the spot scans a portion where exist marks, and returns to a normal value when the spot passes a portion without marks. Since the signal thus fluctuates, even a signal in a servo band also deteriorates to give rise to fluctuations of a gain in the AF servo system and AF offset, which results in out-of-focus on a recorded layer. In such a case, by always holding a signal indicating a portion without marks in signal components detected by the photo detector, the ideal AF error signal 35 and total light amount signal 36 are provided.

An exemplary means for implementing this method is shown in FIG. 26B. FIG. 26B specifically shows the AF detecting circuit 89 and the total light amount detecting circuit 102 in FIGS. 23 and 25, respectively. Front and rear photo detectors 111 and 112 in the drawing illustrating the principle of a front-to-rear differential AF error signal detecting optical system comprise light receiving planes 119, 120 or 121, 122. If the sizes of spots 113, 114 are equal on the front and rear photo detector planes 111, 112, it indicates a focused point. Sum signals of the respective detectors are generated by preamplifiers 115, 116 which have a band in which the spot scans strings of marks, i.e., a data recording/reproducing frequency band. Next, signals in a scanned mark portion are detected by sample and hold circuits 117, 118 and held therein during a period of a servo band. A difference signal of the thus generated signals is derived as the AF error signal 36, while a sum signal of them is derived as the total light amount 36. The sample and hold circuits 117, 118 may be a peak hold type which samples a maximum point of a light amount. Alternatively, an area in which no mark is recorded is previously provided as a sample area in a format, and the sample and hold circuits 117, 118 may recognize such a sample area by a sample timing bit and hold a signal in that area.

Although in this embodiment, a front-to-rear differential method has been shown as an out-of-focus detecting method, another out-of-focus detecting method such as an astigmatism method or an image rotating method may be employed.

Figure 20:
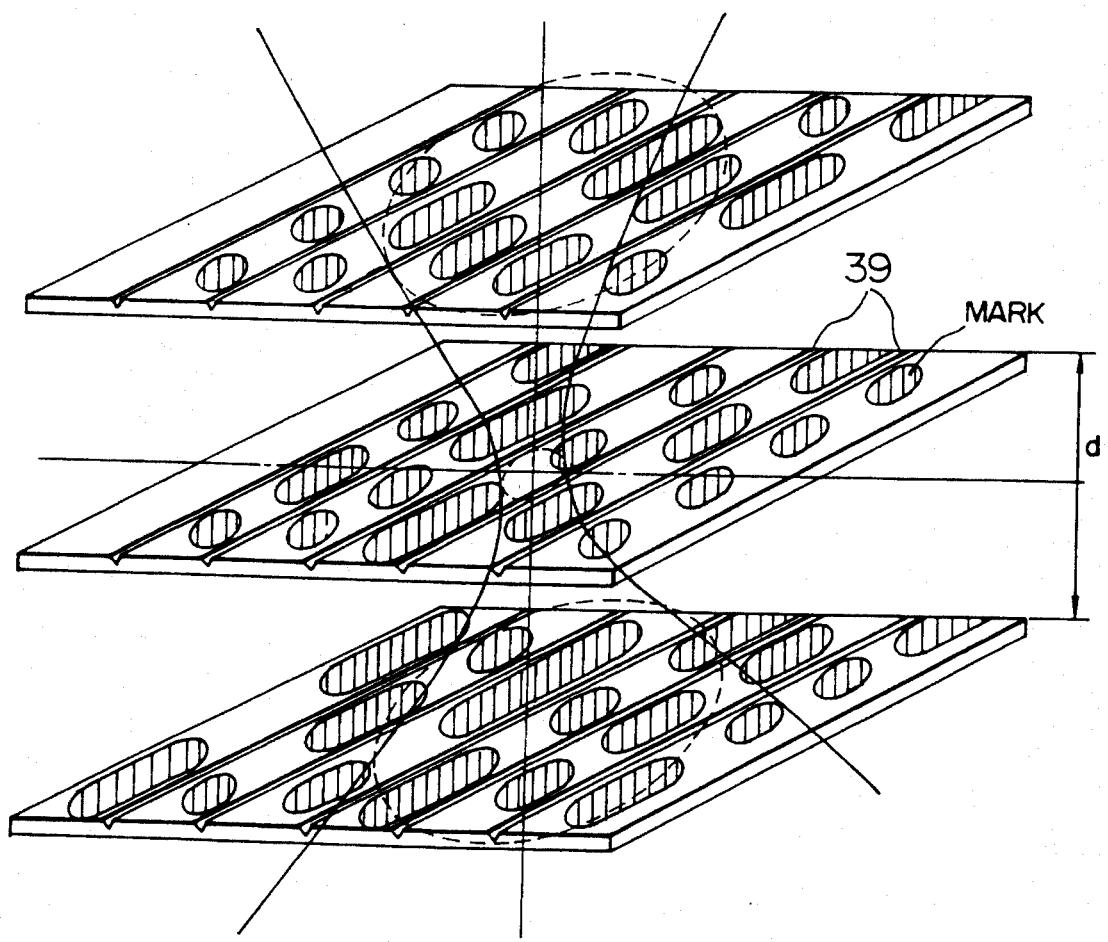
FIG. 20 shows a disc structure for realizing a third reproducing method according to the present invention.

After accessing a target layer, a positioning in the radial direction of the disc, i.e., track positioning is performed on that target layer. A track shift signal can be detected by a known push-pull method by providing each layer with a guide groove 39 as shown in FIG. 20. In this method, since diffracted lights from grooves other than the target layer are out of focus, the phase of light wave striking the grooves is disordered so that a uniform light distribution is present on the photo detector, whereby no influence is exerted on the track shift signal about the target layer. Also, as shown in FIG. 22, if wobble pits 40 are previously formed on each layer in the track direction, a known sample servo method can be applied. The above described spot positioning technique is disclosed in known patent documents JP-A-63-231738 and JP-A-1-19535. A method of forming guide grooves and wobble pits will be later described.

(5) Recording Control Method

Next, description will be made as to a recording control method which achieves the principle of the three-dimensional recording method of the present invention shown in Section (1). As described in Section (1), in order to stably record on a $k_{th}$ layer or a target layer, a recording power P (light intensity) must be determined in consideration of the transmissivity up to the $k_{th}$ layer. Thus, as shown in FIG. 6, the recording condition setting circuit 20 employs address recognition 42 and the transmissivity 42 up to the target $k_{th}$ layer. An example of this circuit is shown in detail in FIG. 7 in a block form, and examples of signals are illustrated in FIG. 9.

Figure 9:
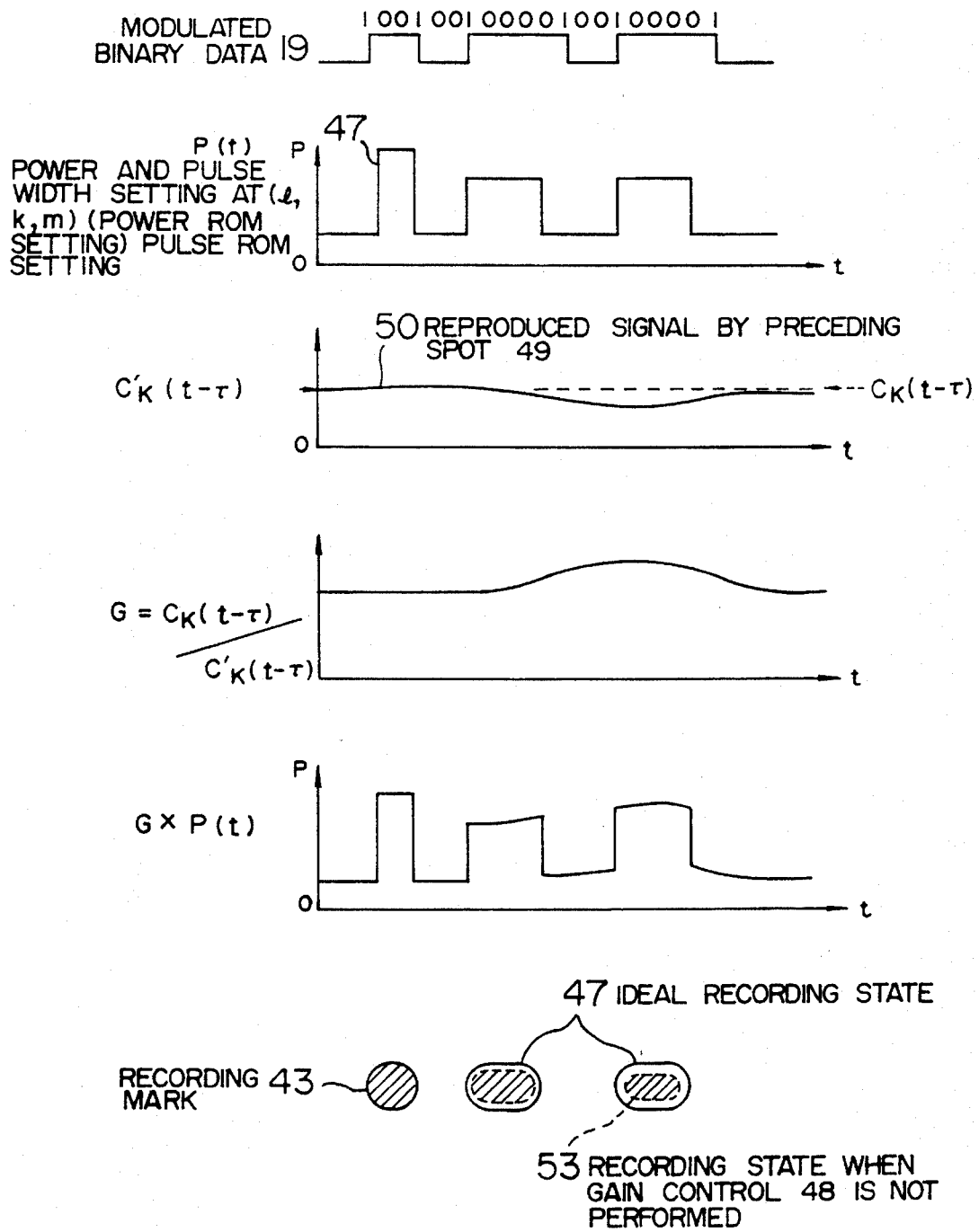
FIG. 9 shows a concept of a recording control method according to the present invention.

Referring to FIG. 9, when binary data 19 is recorded as recording marks 43, recording conditions for the address recognition 41 (l, m, k), for example, setting of recording pulse width, recording power setting condition and so on are previously stored in ROMs 44, 45 in consideration of the difference in recording conditions due to a recording position and a recording state by a data pattern, whereby a light intensity modulation signal P(t) 47 is generated corresponding to the output of a D/A convertor 46, and accordingly the marks in an ideal recording state can be recorded. Such a circuit arrangement indicated by solid lines in FIG. 7A can be applied to the following case.

When the foregoing Section (2) item (b) is employed as the order of recording data, or when the third method for achieving (1) item (2) and Section (2) item (a) are employed, since the transmissivity 42 up to a target layer ($\Sigma Tn$ (n=1, 2, ..., k−1)) has been determined upon producing the disc, if a layer address k is inputted, the transmissivity is handled as a known value.

Figure 7A:
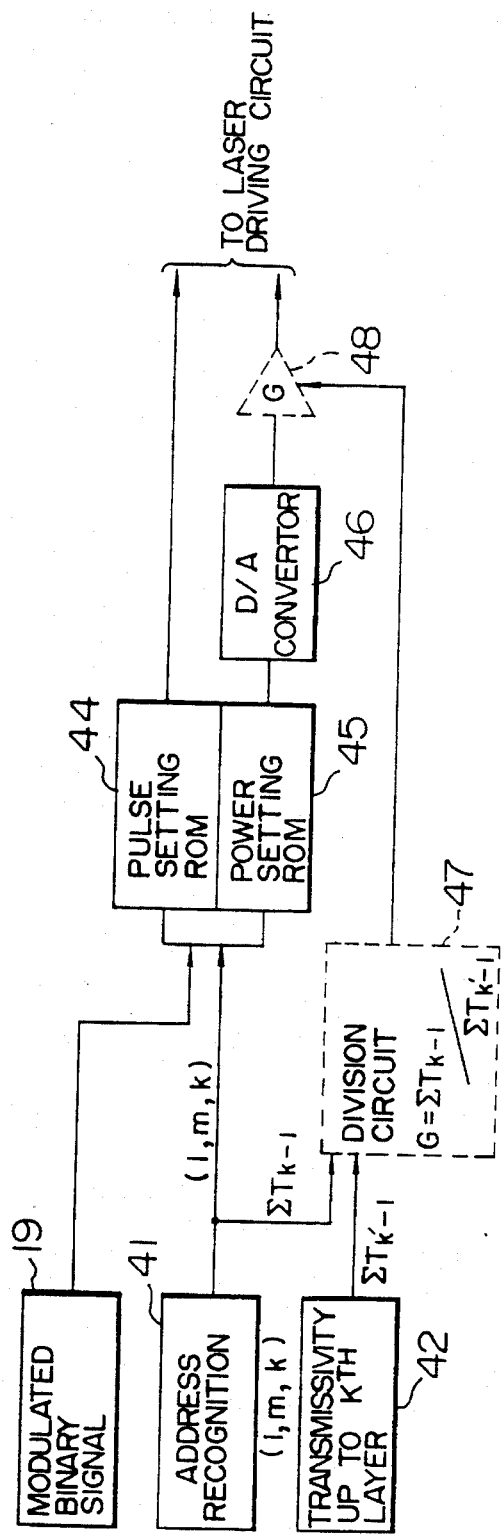
FIGS. 7A, 7B are block diagrams showing a recording control method according to the present invention.

In the cases other than the above, the transmissivity up to a target layer is not known at the time of recording. To coop with this, circuits (47, 48) indicated by broken lines in the circuit of FIG. 7A are added. The power setting ROM 46 has been loaded with recording power setting values in consideration of the transmissivity up to a $k_{th}$ layer when an all-layers unused state.

The transmissivity up to the $k_{th}$ layer $\Sigma Tn$ (n=1, 2, ..., k−1) upon shipment of the disc (or a design value) derived by the address recognition 42 and a transmissivity up to the $k_{th}$ layer $\Sigma Tn'$(n=1, 2, ..., k−1) 42 immediately before recording, detected by a method, later referred to, are inputted to a division circuit 47, while a change G in transmissivity is inputted to a gain control circuit 48, so as to set an optimal recording power.

An example to which this circuit arrangement can be applied will be shown. Suppose that "the management layer for layer data" described in Section (2) is provided and its contents have previously been reproduced for recognition, the third method for achieving Section (1) item <3> is applied, and the data management referred to in Section (2) items (c), (d) is implemented. If a layer on which recording is in progress is known, the transmissivity up to the $k_{th}$ layer $\Sigma Tn'$(n=1, 2, ..., k−1) 42 can be derived since the transmissivity of each layer after recording in a light spot is constant and known.

Another example is a method of previously scanning the spot to detect a change G in transmissivity.

Figure 7B:
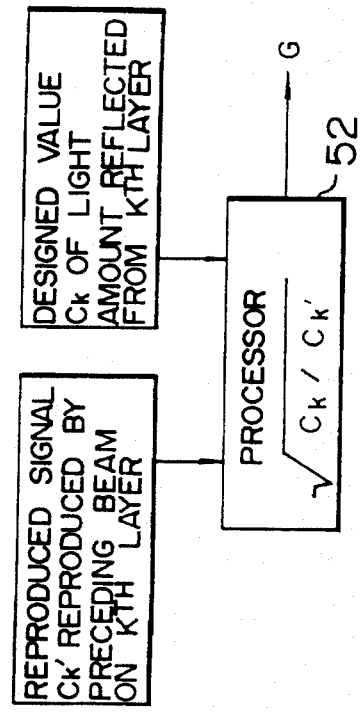
Figure 8:
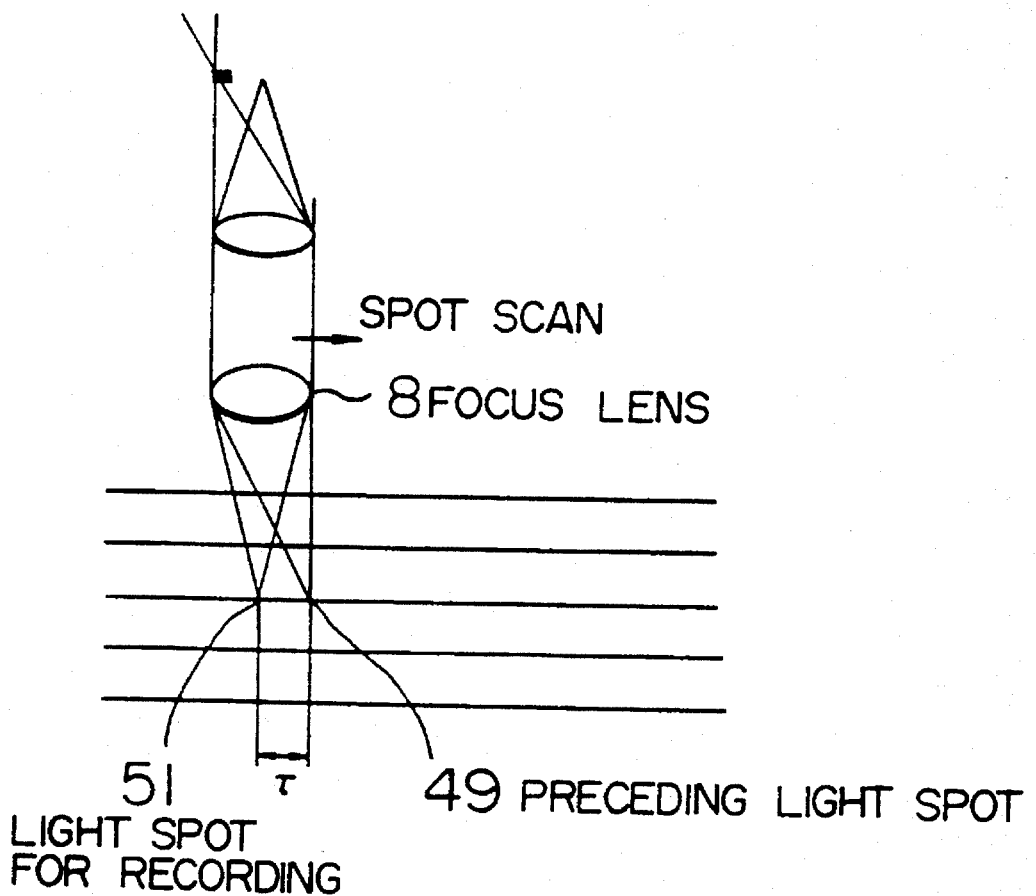
FIG. 8 shows RBW (Read Before Write) by a preceding beam.

As the method of previously reproducing an area on which recording is to be performed, after a reproduction check is done in the first rotation of the disc in a recording mode, recording is performed in the next rotation, and then a recording error check is done in the third rotation. Another method is one which employs a plurality of spots as shown in FIG. 8 and performs a reproduction check by a preceding spot 49. Here, the latter method is explained as an example. The reproduction check employs a reproduced signal C'k(t−τ) derived by the preceding spot 49, where τ represents the distance between the preceding spot 49 and a recording spot 51 converted into a time. Then, the transmissivity change G is calculated by a processor 52 as a square root of a ratio of a reproduced signal Ck' in a state where the spot is focused on the target $k_{th}$ recording layer to a reproduced signal Ck as a design value which has previously been set upon shipment of the disc, as shown in FIG. 7B. This calculation is performed because the signal is reproduced by using a reflected light, so that a change in transmissivity up to the $k_{th}$ layer appears in the reproduced signal in the form of its square.

It should be noted however that the value of the reproduced signal Ck can be detected by previously providing a non-recording area with respect to the layer direction on a disc plane, as a check area in a disc format, and absorbing variations among different discs and optical variations in a disc. A highly accurate recording power control is thereby achieved. The photo detector 10 for generating reproduced signals may be formed in the shape of FIG. 1, as has been described in connection with the first method for satisfying the condition in Section (1) item <3>, to reduce the influence of lights reflected from other layers, whereby reflected light components only from the target layer can be detected as reproduced signal so that the transmissivity change G can be further accurately derived. Although a recording state 53 when gain control is not performed is different from the ideal recording state 47 as shown in FIG. 9, the ideal recording state 47 can be achieved by performing a gain control for the recording power and recording with G×P(t).

(6) Reproduction Control Method

Next, the reproduction control circuit 25 shown in FIG. 6 will be described in detail with reference to the accompanying drawings. Here, in addition to the principle of reproduction for reducing inter-layer cross-talk by the first to third methods shown in Section (1), a fourth method will be shown for suppressing inter-layer cross-talk components in a data signal band which may arise when an inter-layer distance is further reduced in order to achieve a higher recording density or inter-layer cross-talk components which may arise when the optical system is shifted from an ideal state. The fourth method, in addition to the detection of reflected light components from a target layer as shown in the first method, detects reflected light components from adjacent layers which particularly include a majority of inter-layer cross-talk, and removes components mutually included in those detected by these two methods by a calculation to extract reflected light components of the target layer.

FIG. 17A shows the principle of the optical system employed in the fourth method. Although the basic configuration is the same as that shown in FIG. 1, photo detectors 54, 55 are further positioned on focal planes of adjacent layers (k+1), (k−1) on the light receiving plane side when the focus is placed on a $k_{th}$ layer. However, since the photo detectors 54 and 55 disposed as shown in FIG. 17A mutually shield the light, half mirrors 56, 57 are inserted in the focus system. Alternatively, beam splitters may be inserted in place of the half mirrors as shown in FIG. 17B. The shape of the photo detectors 10, 54 and 55 is determined to be a circle, the diameter of which is D=(λ/NAI). Also, pinholes may be used to implement these detectors as shown in FIG. 17C. Reproduced signals detected by the respective photo detectors in this arrangement are shown in FIG. 14.

Figure 13:
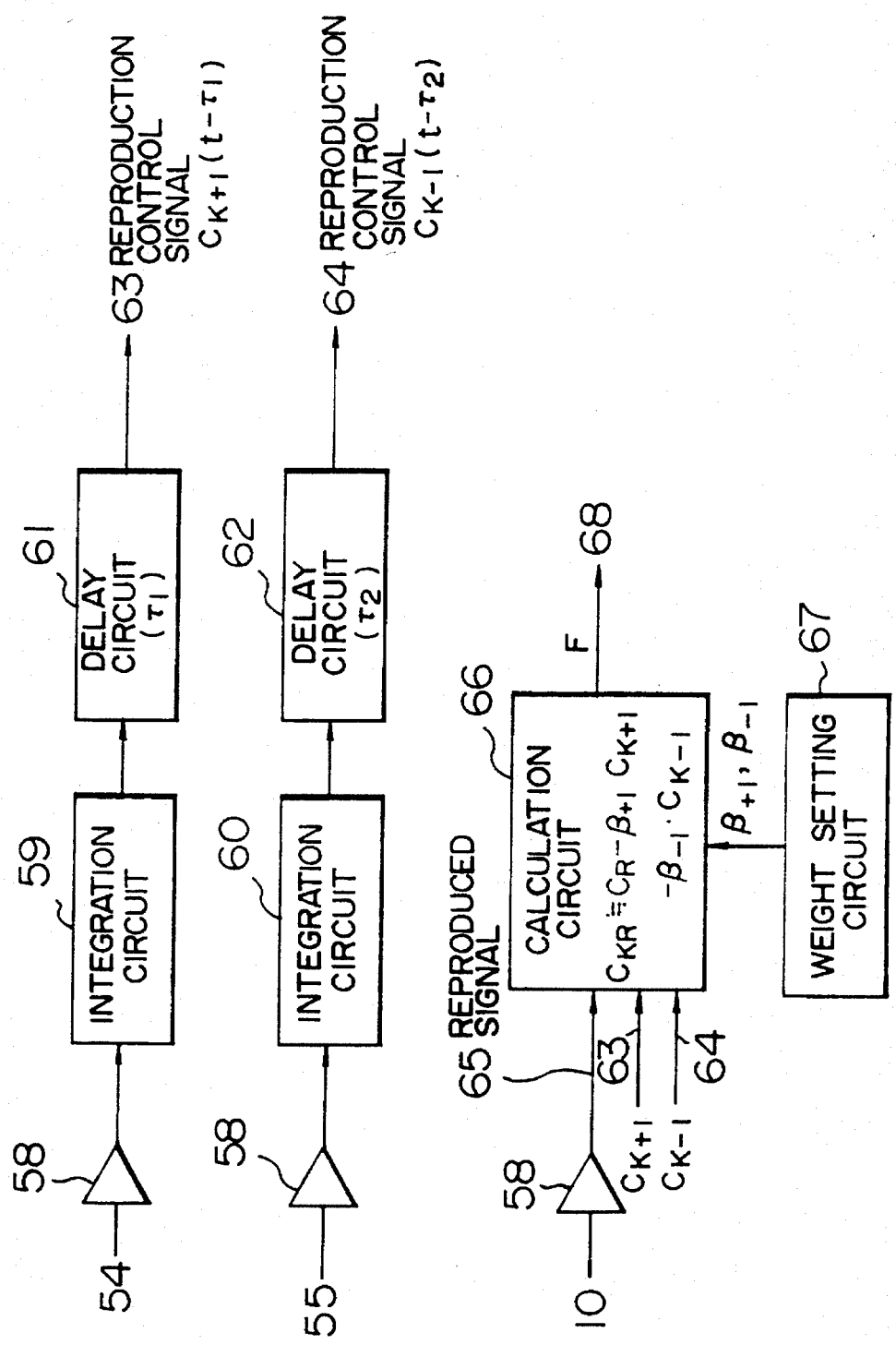
FIG. 13 is a block diagram showing a reproduction control method according to the present invention.
Figure 14:
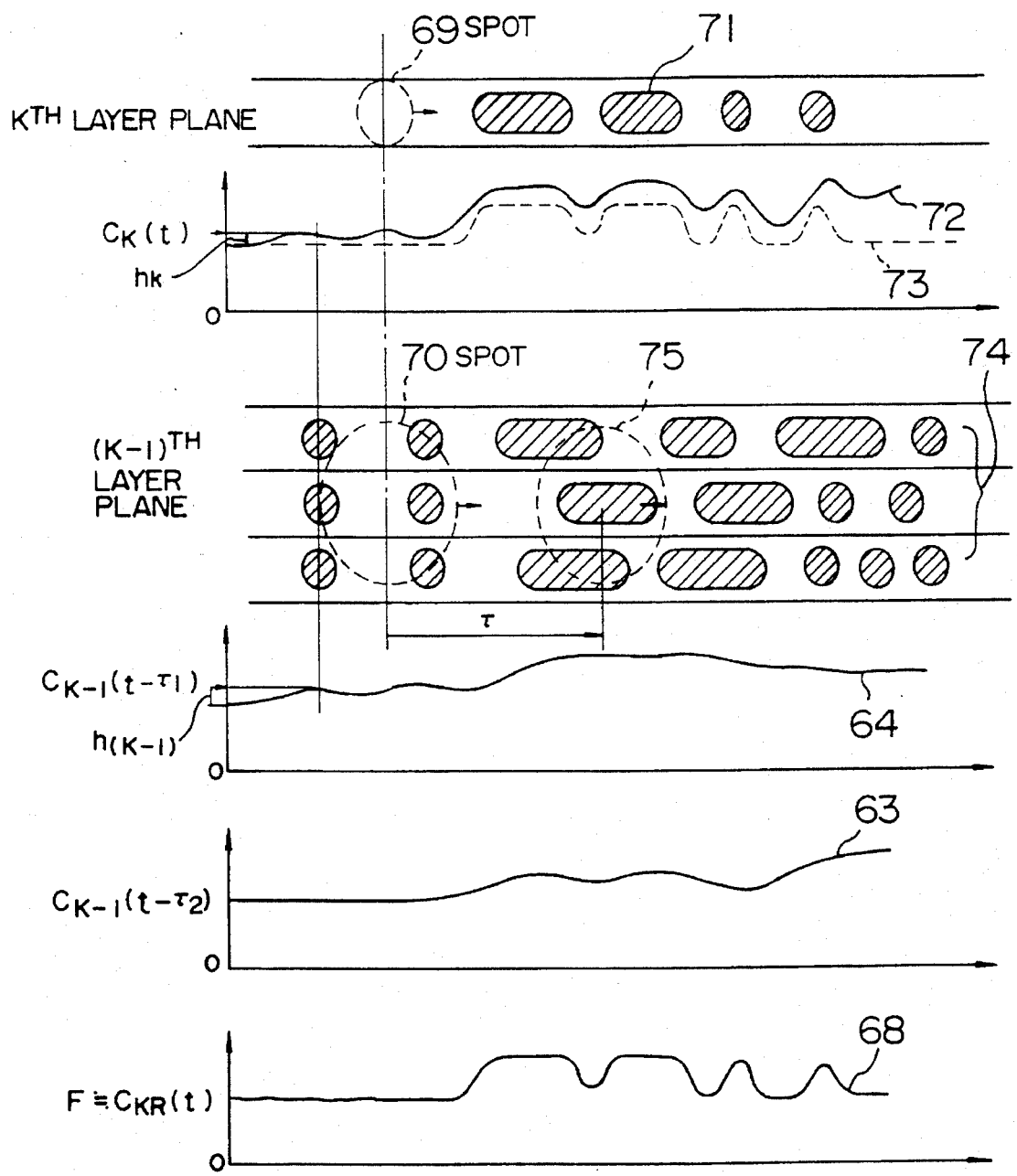
FIGS. 14–16 show a concept of the reproduction control method of the present invention.

FIG. 14 shows a reproduced signal Ck detected by the photo detector 10; a reproduced signal C(k−1) detected by the photo detector 55; and a reproduced signal C(k+1) detected by the photo detector 54. These reproduced signals are generated by a circuit shown in FIG. 13. It should be noted that if a system shown in FIG. 17 is employed, integration circuits 59, 60 and delay circuits 61, 62 shown in FIG. 13 are not necessary. As shown in FIG. 14, when the distance between adjacent layers is shorter than the distance between an adjacent layer which satisfies the first—third methods and a target layer, a reproduced signal 73 without inter-layer cross-talk which is derived when a spot 69 scans a mark string 71 on a $k_{th}$ layer fluctuates as a reproduced signal 72. This is because, as the spot 69 scans on the $k_{th}$ layer, components of a reproduced signal 64 detected from the $(k−1)_{th}$ adjacent layer by a spot 70 defocused on the $(k−1)_{th}$ adjacent layer which scans a mark array 74 on the $(k−1)_{th}$ adjacent layer, and components of a reproduced signal 63 likewise detected from the $(k+1)_{th}$ adjacent layer on the opposite side in the Z-direction are included in an unneglectable degree with respect to the reproduced signal 73. For this reason, the following equation is calculated by a calculation circuit 66 as shown in FIG. 13.

$$Ck \approx CkR + \beta \times C(k-1)R + \beta \times C(k+1)R \quad \text{(Equation 22)}$$
$$C(k-1) \approx C(k-1)R + \beta \times CkR + \beta \times C(k-2)R$$
$$C(k+1) \approx C(k+1)R + \beta \times CkR + \beta \times C(k+2)R$$

where CnR represents reproduced signal components by a reflected light only from an $n_{th}$ layer.

In Equation 22, β<1 is satisfied. From the above equation:

$$\begin{aligned}\text{Calculation } F &\equiv Ck - \gamma \times C(k-1) - \quad \text{(Equation 23)}\\ &\quad \gamma \times C(k+1)\\ &\approx CkR + \beta \times C(k-1)R +\\ &\quad \beta \times C(k+1)R -\\ &\quad \gamma \times \{C(k-1)R + \beta +\\ &\quad CkR + \beta \times C(k-2)R\} -\\ &\quad \gamma \times \{C(k+1)R + \beta \times\\ &\quad CkR + \beta \times C(k+2)R\}\end{aligned}$$

Since C(k−2)R and C(k+2)R are sufficiently small and frequency components are also low, these terms can be neglected. Thus, $$\begin{aligned}F &\approx (1-2\gamma\beta) \times CkR + (\beta-\gamma) \times C(k-1)R + \quad \text{(Equation 24)}\\ &\quad (\beta-\gamma) \times c(k+1)R\end{aligned}$$

Here, if $\gamma \equiv \beta < 1$, $F \approx (1-\beta^2) \times CkR$ (Equation 25)

whereby the inter-layer cross-talk can be suppressed, and the reproduced signal 68 after being processed coincides with the reproduced signal 73 as shown in FIG. 14. As an alternative arrangement for achieving the foregoing fourth method, an example of employing a plurality of spots is shown below. Referring again to FIG. 14, a spot 75 having the same spot diameter as the defocused spot 70 scans the two adjacent layers (k−1) and (k+1) prior to the spot 69 to detect signals to be reproduced. Note that delay circuits 61, 62 corresponding to spot intervals are inserted, as shown in FIG. 13, to perform calculations similar to the above. An example of an optical system used in this arrangement is shown in FIG. 18. Referring to FIG. 18, an optical axis is shown for three separate cases in order to illustrate the principle of the optical system. This principle is applicable also to an optical system employing a focus lens 8. A means for setting the spot diameter of a spot 75 which is focused on the upper adjacent layer and a spot 82 which is focused on the lower adjacent layer to (2d×NAF) may be a diaphragm 83 inserted as shown in FIG. 18 to reduce an effective aperture. More specifically, an effective diameter a may be changed to λ/(2d×NAF²)×2. Of course, similar effects can be produced if the numerical apertures of the focus lenses for the two preceding spots are reduced. That is, NAF'=λ/(2d×NAF) is employed.

Figure 15:
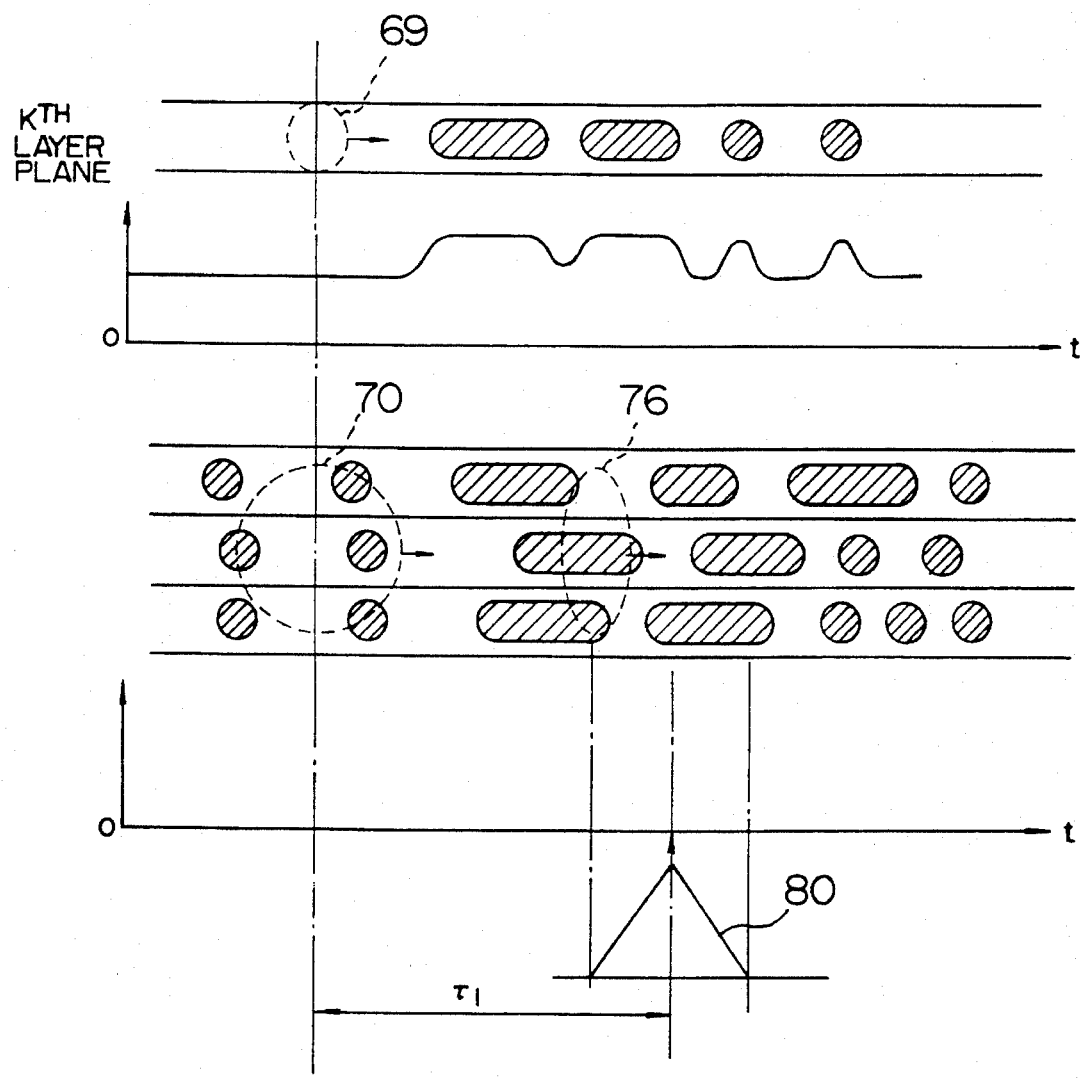
Figure 16:
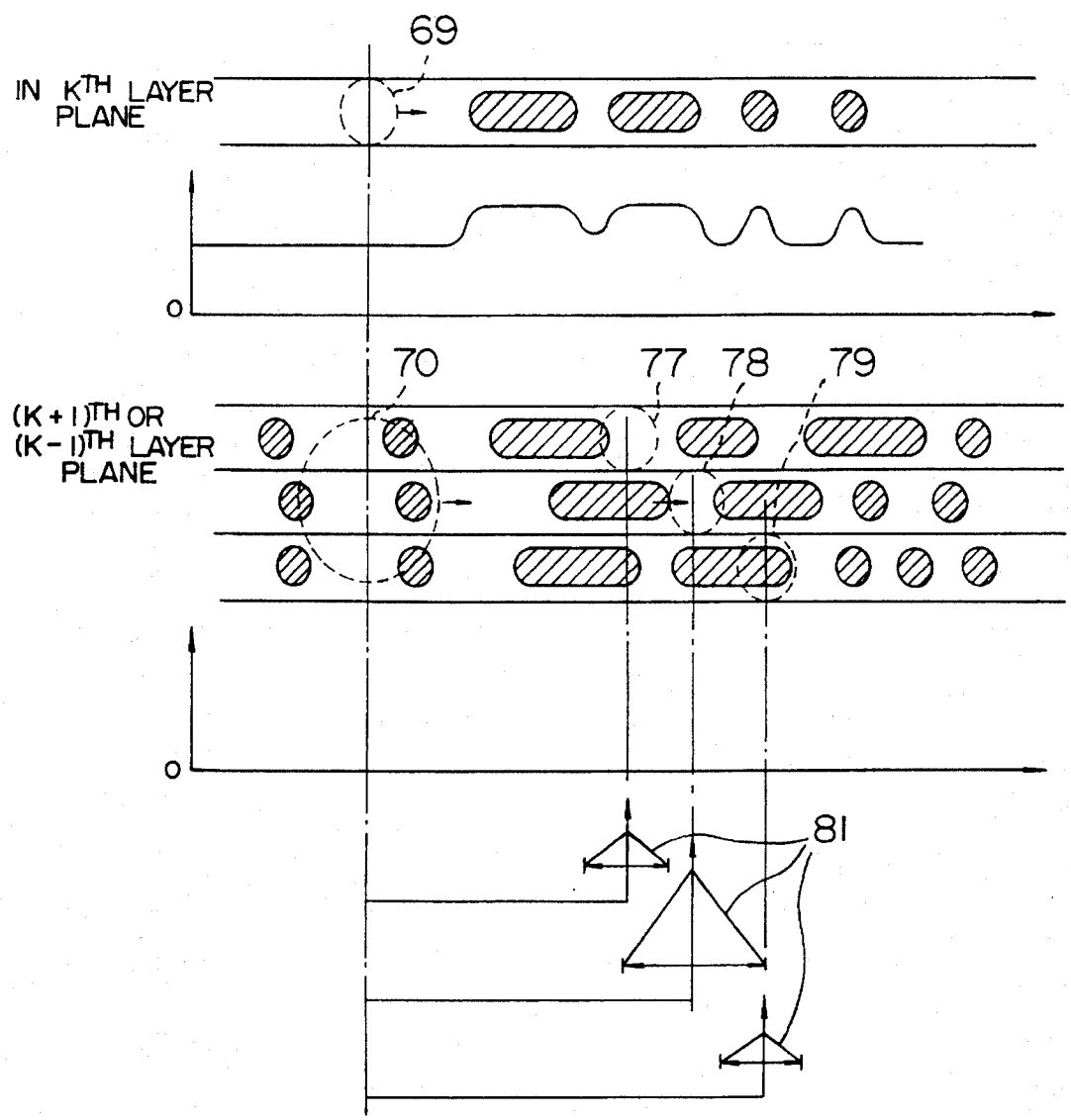

While the shape of the preceding spot 75 is hitherto the same as the spot shape 75 shown in FIG. 14 (i.e., the same shape as that of the spot 70), a spot shape 76 shown in FIG. 15 (an elliptical shape oblonger than the spot 75) or three spots 77, 78 and 79 shown in FIG. 16, by way of example, can produce similar effects. For employing these spots, integration circuits 59, 69 are inserted in the circuit of FIG. 13. Referring to FIG. 15, if a reproduced signal detected by the preceding spot is multiplied with a weighting function 80 derived by approximating a Gaussian distribution, which is an intensity distribution of the spot, to, for example, a triangle distribution and integration is performed to this product, a reproduced signal when the spot 75 is scanning the mark string 74 can be effectively derived. As to the spots shown FIG. 16, a weighting function 81 may be similarly employed in consideration of a spot intensity distribution in the two-dimensional direction.

Figure 19:
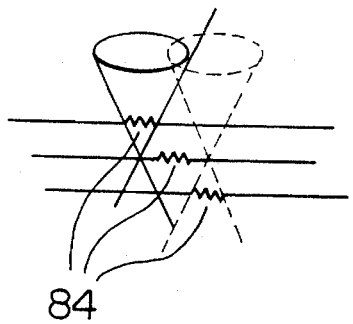
FIG. 19 shows a calculation coefficient $\gamma (\equiv \beta)$ check area and a diagram of the principle.

Now, description will be made as to a method of calculating β in a weight setting circuit 67 used in the calculation circuit 66 shown in FIG. 13. If mark recording areas on at least three layers including upper and lower adjacent layers are located as a disc format such that they are not included in the same light flux, as shown in FIG. 19, h(k−1)/hk and h(k+1)/h are set to β(−1) and β(+1) as shown in FIG. 14, whereby weights for the upper and lower adjacent layers can be derived.

While in the embodiments so far described, description has been made as to a case where recording/reproduction is performed basically on a single layer, it is also possible to simultaneously recording/reproducing on two or more layers by using a plurality of spots and focusing these spots on each layer. In other words, parallel recording/reproduction is enabled, whereby a data transfer rate can be increased. A means for forming a plurality of spots may be a plurality of optical heads 22 which are located on a single disc or a single head having a plurality of light source incorporated therein. Also, by employing light sources which generate lights having different wavelength from each other as a plurality of light sources, a recording layer to be recorded can be selected by a wavelength, and separate reproduction is also enabled by a wavelength filter.

(7) Embodiment of Disc Structure and Disc Producing Method

On the surface of a disc-shaped chemical tempered glass plate having a diameter of 130 mm and a thickness of 1.1 mm, a replica substrate 401 is produced by a photo polymerization method (2P method). Formed on the replica substrate 401 is a UV cured resin layer having tracking guide grooves at intervals of 1.5 μm and prepits (referred to as a header section) in the form of uneven pits in elevated portions between grooves at the start of each of 17 sectors formed by equally dividing the disc plane for representing layer addresses, track addresses, sector addresses and so on.

The structure of the disc will be explained with reference to FIG. 11. On the replica substrate 40, an antireflection film 402 made of silicon nitride (SIN) was formed in a thickness of about 50 nm by using a sputtering apparatus which provides good uniformity and reproductivity of film thickness. Next, a recording film 403 composed of $In_{54}Se_{43}Tl_3$ was formed in a thickness of 10 nm in the same sputtering apparatus. On this recording film 403, a UV cured resin layer 404 having tracking guide grooves and prepits representing layer addresses, sector addresses, track address and so on was formed in a thickness of 30 μm in consideration of a heat insulation effect associated with other layers by the 2P method which uses a transparent frame such that the light is incident from the frame side.

Subsequently, an SiN antireflection film 405 was formed in a thickness of about 50 nm in the sputtering apparatus, and on this layer a recording film 406 composed of $In_{54}Se_{43}Tl_3$ was formed in a thickness of 10 nm. Further on this film a UV cured resin layer 407 having tracking guide grooves and prepits representing layer addresses, sector addresses, track address and so on was formed in a thickness of 30 μm by the 2P method. Further on this layer, an SiN antireflection film 408 of silicon nitride was formed in a thickness of about 50 nm in the same sputtering apparatus, and a recording film 409 composed of $In_{54}Se_{43}Tl_3$ was formed in a thickness of 10 nm on this antireflection film 408.

In the same manner, an SiN antireflection film 402'; an $In_{54}Se_{43}Tl_3$ recording film 403'; a UV cured resin layer 404'; an antireflection film 405'; an $In_{54}Se_{43}Tl_3$ recording film 406'; a UV cured resin layer 407'; an SiN antireflection film 408'; and an $In_{54}Se_{43}Tl_3$ recording film 409' were sequentially formed on a like replica substrate 401'. The two discs thus produced were bonded by a bonding agent layer 410 with the layers 409 and 409' being directed inwardly. The thickness of the bonding agent layer is about 50 μm. The disc thus produced allows recording/reproduction to be performed on a single disc from both sides.

While in the foregoing example of the disc production, guide grooves 39 for push-pull tracking has been explained, the wobble pits 40 used for a sample servo method can be likewise formed by a similar method to that for forming the prepits.

The disc produced in this embodiment is such that a change in atomic arrangement of atoms constituting the recording films is caused by irradiation of a laser light to change optical constants, and data is read out utilizing the difference in reflectivity. The change in atomic arrangement refers to a phase change between crystalline and non-crystalline.

In the disc immediately after forming the recording films, the recording film constituting elements are not sufficiently reacted so that the recording films are in a non-crystalline state. When this disc is used as a Write Once type medium, a recording laser light is irradiated to the recording films to perform crystallization recording. Alternatively, the recording films are previously heated by irradiation of an Ar laser light, flash anneal or the like, such that each element is sufficiently reacted and crystallized, and thereafter a recording laser light with a high power density is irradiated to the recording films to perform non-crystallization recording. Here, a range of a laser power suitable to the crystallization recording should be above a temperature causing crystallization and below a temperature causing non-crystallization. On the other hand, when this disc is used as an overwritable type medium, the recording films are previously heated by irradiating an Ar laser thereto, subjected to flash anneal or the like to sufficiently react and crystallize each element, and thereafter, a recording laser light which is modulated between a laser power suitable for crystallization and a laser power suitable for non-crystallization is irradiated onto the recording films to overwrite data thereon.

The disc was rotated at 1800 rpm, the light (wavelength is 780 nm) from a semiconductor laser maintained at a power level (1 mW) with which recording was not performed was converged by a lens disposed in a recording head and irradiated onto a recording film on the first layer through the substrate, and a reflected light was detected, thereby driving the head such that the center between the tracking grooves was always coincident with the center of a light spot. By forming a recording track between two adjacent grooves, the influence of noise generated from the grooves can be avoided. Automatic focusing was performed so as to focus the light spot on the recording film while thus continuing the tracking, to perform recording/reproduction. When the light spot passed a recording portion, the laser power was decreased to 1 mW, and the tracking and automatic focusing was still continued. It should be noted that the tracking and automatic focusing is maintained also during a recording operation. This focusing enables the light spot to be independently focused on the respective recording layers 403, 406 and 409 of the disc.

A case where recording was performed sequentially on recording films from the substrate side toward the lowermost layer will be shown, assuming that the disc constructed as described above is rotated at a linear velocity of 8 m/s (rotational speed: 1800 rpm, radius: 42.5 mm). First, the focus was placed on the recording film 403 which was irradiated with a recording pulse with a recording frequency at 5.5 MHz and a period of 90 ns to record on this film 403. A recording power dependency of a reproduced signal intensity at this time is shown below:

| Recording Power (mW) | Reproduced Signal Intensity (mV) |
|---|---|
| 6 | 30 |
| 7 | 100 |
| 8 | 160 |
| 9 | 210 |
| 10 | 250 |
| 11 | 280 |
| 12 | 300 |
| 14 | 310 |

Then, after recording on the recording film 403, the light spot was focused on the recording film 406 to perform recording thereon. A recording power dependency of a reproduced signal intensity at this time is shown below:

| Recording Power (mW) | Reproduced Signal Intensity (mV) |
|---|---|
| 7 | 25 |
| 8 | 95 |
| 9 | 155 |
| 10 | 205 |
| 11 | 245 |
| 12 | 275 |
| 13 | 295 |
| 15 | 305 |

After recording on the recording films 403 and 406, the light spot was focused on the recording film 409 to perform recording thereon. A recording power dependency of a reproduced signal intensity at this time is shown below:

| Recording Power (mW) | Reproduced Signal Intensity (mV) |
|---|---|
| 8 | 20 |
| 9 | 90 |
| 10 | 150 |
| 11 | 200 |
| 12 | 240 |
| 13 | 270 |
| 14 | 290 |
| 16 | 300 |

Also, the results will be shown below, when, after recording a signal at 3 MHz on the recording film 403, a signal at 4 MHz on the recording film 406 and a signal at 5 MHz on the recording film 409, the light spot was focused on the recording films 403, 406 and 409 to read reproduced signals therefrom.

The reproduced signals were analyzed by a spectra analyzer, and, as a measuring condition, the resolution frequency width was selected to be 30 kHz. The following table shows measurement results of CN ratios (ratio of noise components to carrier components) of the reproduced signals at a carrier frequency.

| | 3 MHz | 4 MHz | 5 MHz |
|---|---|---|---|
| Recording Film 403 | 55 dB | 23 dB | 6 dB |
| Recording Film 406 | 25 dB | 53 dB | 21 dB |
| Recording Film 409 | 10 dB | 23 dB | 51 dB |

It will be understood from the above table that highly reliable signals were reproduced from each layer with the CN ratio of not less than 50 dB and inter-layer cross-talk from adjacent recording layers below 25 dB.

Next, another disc was produced, where thin films composed of $Ge_{14}Sb_{29}Te_{57}$ were formed in a thickness of 2 nm as the recording films 403, 406 and 409, thin films of ZnS were formed in a thickness of 50 nm as the antireflection films 402, 405 and 408, and the rest of the structure was completely the same as the foregoing disc. This disc features that the transmissivity of recorded layers decreases. For this reason, recording is performed from the substrate side.

The measurement was done under the condition that the disc structured as described above was rotated at a linear velocity of 8 m/s (rotational speed: 1800 rpm, the radius: 42.5 mm), and recording was performed sequentially from the lowermost layer toward upper layers. First, the focus was placed on the recording film 409 to record thereon by irradiating a recording pulse with a recording frequency at 5.5 MHz and a duration being 90 ns. The recording power dependency of the reproduced signal intensity at that time is shown in the following table.

| Recording Power (mW) | Reproduced Signal Intensity (mV) |
|---|---|
| 7 | 15 |
| 8 | 85 |
| 9 | 145 |
| 10 | 195 |
| 11 | 235 |
| 12 | 265 |
| 13 | 285 |
| 15 | 295 |

After recording on the recording film 409, the focus was placed on the recording film 406 to record thereon. The recording power dependency of the reproduced signal intensity at that time is shown in the following table.

| Recording Power (mW) | Reproduced Signal Intensity (mV) |
|---|---|
| 7.5 | 20 |
| 8.5 | 90 |
| 9.5 | 150 |
| 10.5 | 200 |
| 11.5 | 240 |
| 12.5 | 270 |
| 13.5 | 290 |
| 15.5 | 300 |

After recording on the recording films 409 and 406, the focus was placed on the recording film 403 to record thereon. The recording power dependency of the reproduced signal intensity at that time is shown in the following table.

| Recording Power (mW) | Reproduced Signal Intensity (mV) |
|---|---|
| 8 | 25 |
| 9 | 95 |
| 10 | 155 |
| 11 | 205 |
| 12 | 245 |

-continued

| Recording Power (mW) | Reproduced Signal Intensity (mV) |
|---|---|
| 13 | 275 |
| 14 | 295 |
| 16 | 305 |

Also, the measurement results will be shown in the following table as to the CN ratios at a carrier frequency of reproduced signals which were read from the recording films 403, 406 and 409 by placing the focus thereon, after signals at 3 MHz, 4 MHz and 5 MHz had been recorded on the recording films 403, 406 and 409, respectively.

|  | 3 MHz | 4 MHz | 5 MHz |
|---|---|---|---|
| Recording Film 403 | 54 dB | 24 dB | 7 dB |
| Recording Film 406 | 26 dB | 52 dB | 22 dB |
| Recording Film 409 | 11 dB | 24 dB | 50 dB |

As shown in the above table, highly reliable signals were reproduced from each layer with the CN ratio of not less than 50 dB and inter-layer cross-talk from adjacent recording layers below 25 dB.

When a plastic disc of polycarbonate or acrylic resin made by injection molding was used as the substrate other than the chemical tempered glass used in the above embodiment, similar results were obtained.

Also, when Ge-Sb-Te composition, Ge-Sb-Te-M (M represents a metal element) composition, In-Sb-Te composition, In-Sb-Se composition, In-Se-M (M represents a metal element) composition, Ga-Sb composition, Sn-Sb-Se composition, Sn-Sb-Te composition and so on were used as the recording film other than the foregoing In-Se-Tl composition, similar results were likewise obtained.

Further, other than the foregoing recording film utilizing a phase change between crystalline and non-crystalline, An In-Sb composition utilizing a crystalline-to-crystalline phase change or the like may be used as a recording film to derive similar results.

Figure 11:
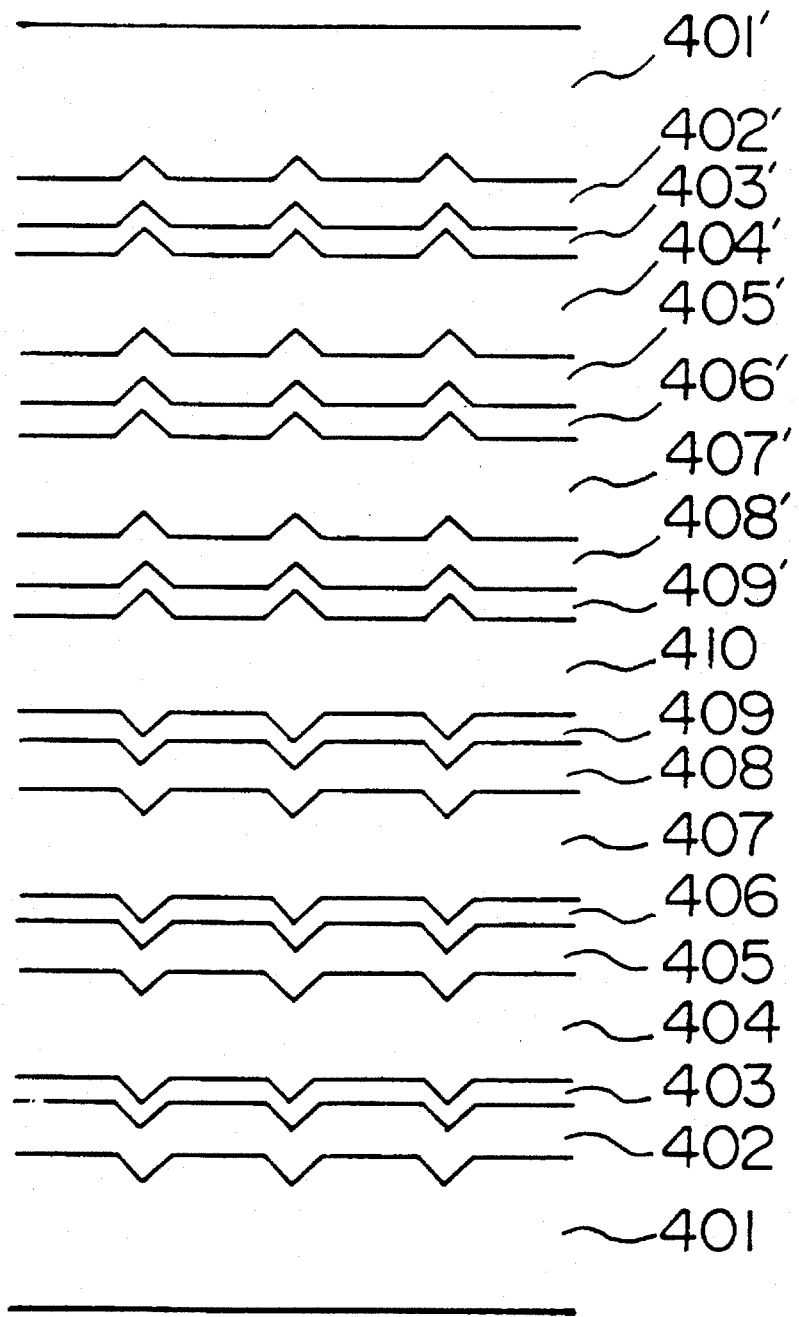
FIG. 11 is a cross-sectional view showing the structure of a phase change type information recording medium used in an embodiment of the present invention.

Particles of Bi-substituted garnet ($YIG(Y_3Bi_3Fe_{10}O_{24})$) of 20 nm in diameter were dispersed in an organic binder and spin coated to produce a recording film on a substrate similar to that shown in FIG. 11. The Bi-substituted garnet of 20 nm in diameter was produced by a coprecipitation method. The used organic binder was that with the refractivity equal to 25. A film thickness of the spin coated recording film was about 1.5 µm, and the reflectivity (R), transmissivity and absorptivity (k) thereof were R=8%, T=12% and K=80%, respectively, at a wavelength of 530 nm. Since the volume ratio of the Bi-substituted garnet in the binder was about 60%, a rotating angle of plane of polarization of a reflected light was about 0.8°. A method of stacking a multiplicity of layers with UV cured resin layers inserted between the layers, a method of bonding two discs, and a recording/reproducing method were similar to those of the foregoing embodiment. However, the wavelength of a light source is selected to be λ=530 nm.

Figure 12A:
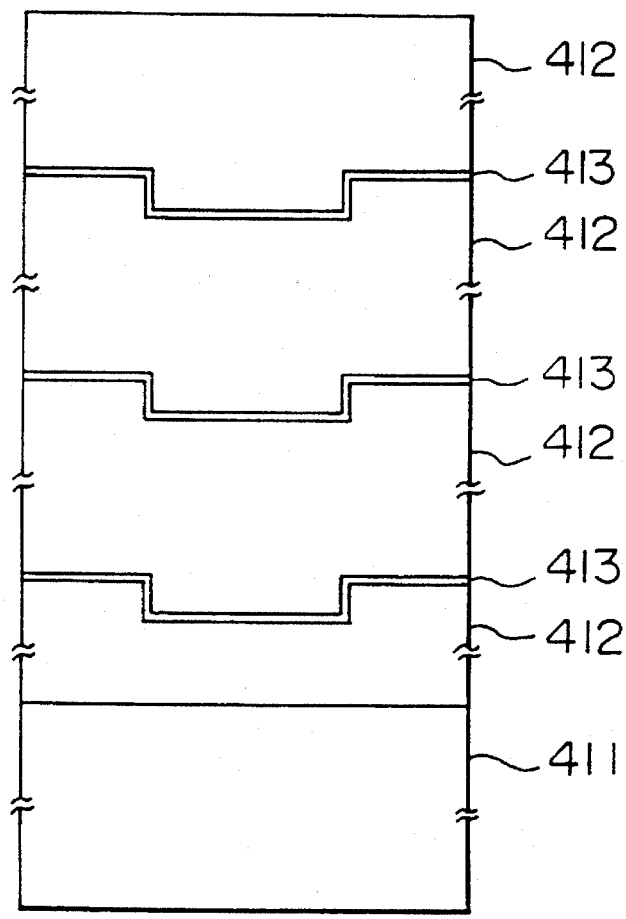
FIGS. 12A, 12B are partial cross-sectional view of a third information recording medium used in the present invention.
Figure 12B:
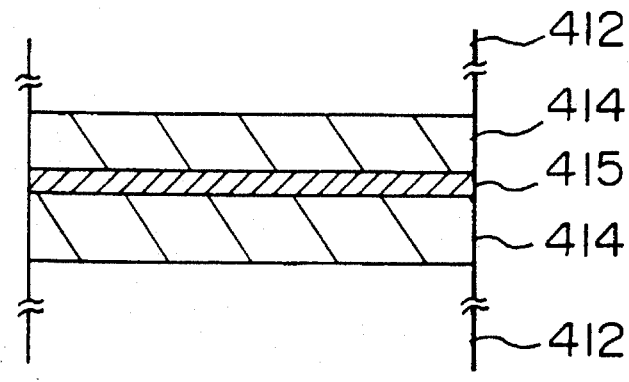

Next, explanation will be given of an example where an experiment was made on recording/reproduction using the information recording medium structured as shown in FIG. 12. FIG. 12A shows part of a cross-sectional view of an information recording medium; and FIG. 12B shows a cross-sectional view of part of a recording layer.

A laser light guide groove with a track pitch being 1.5 µm was formed in a UV cured resin layer 412 of 50 µm in thickness on a disc-shaped glass substrate 411 with a diameter of 13 cm and a thickness of 1.2 mm. Next, a recording layer 413 was stacked by a vacuum vapor deposition method. The recording layer 413 comprises two $Sb_2Se_3$ layers 414 of 8 µm in thickness sandwiching a Bi layer 415 of 3 µm in thickness, as shown in FIG. 10B. Further, on the recording layer 413, two pairs of a UV cured resin layer 412 of 30 µm in thickness formed with laser light guide groove and the recording layer 413 were stacked. In other words, three recording layers were provided. On the top, a UV cured resin layer of 100 µm in thickness was provided for the purpose of protecting the recording layers. It is assumed that the recording layers are referred to as a first recording layer, a second recording layer and a third recording layer from the substrate side.

A track groove was selected to be U-shaped one, and the widths of a land portion and a groove portion were both selected to be 0.75 µm. Measured reflectivities of the first, second and third recording layers were 8.5%, 5.8% and 4.4%, respectively. Recording was performed by irradiating each recording layer with a laser light of not less than 6.0 mW. The reflectivities of laser light irradiated portions on the first, second and third recording layers were 18.5%, 13.0% and 9.4%, respectively.

The change in reflectivity between the recorded and unrecorded recording layers is caused by the alloying of the recording layers. Specifically explaining, when part of recording layer made up of two $Sb_2Se_3$ layers and a Bi layer is heated by the irradiation of the recording laser light, a diffusion reaction occurs between Se and Bi, which results in alloying. Consequently, an area with different optical constants, i.e., a recording point is formed on the recording layer. It should be noted that in the recording layer composed of $Sb_2Se_3$ and Bi, the alloying causes the reflectivity and the transmissivity to increase and the absorptivity to decrease.

Although not performed in this embodiment, if a land portion is irradiated with a continuous laser light before recording, the land portion is alloyed, with the result that an average transmissivity per recording layer is increased by 10%. Therefore, since the reflectivities before and after recording are increased, this is convenient to tracking and so on. If recording is performed on both the land portion and the groove portion, an average transmissivity per recording layer can be likewise increased. The recording layer is not limited to a combination of $Sb_2Se_3$ and Bi, but may be of any combination as long as alloying is caused by temperature rise.

Since the present invention provides light spot focusing optical system, a disc structure, and a light detecting optical system which enable stable recording and reproducing in recording and reproducing processes, a coding method for suppressing particularly problematic inter-layer cross-talk, a cross-talk canceling method, a three-dimensional data format, a disc producing method associated with the data format, a three-dimensional access method, highly reliable data can be recorded and reproduced by focusing a light spot on each layer of a multi-layer structured disc.

What we claim:

1. An optical information reproducing method of using an optical disk having a plurality of recording layers recording optically detectable marks, wherein a laser beam is converged on each of the recording layers with an object lens driven by an actuator, and a light returned from the recording layer is detected to detect the marks, comprising the steps of:

driving the actuator by a servo control so that the laser beam is maintained in a focusing state on an arbitrary recording layer as an optical spot during detection of the mark; and supplying a pulse-like signal to the actuator to be driven when the optical spot is moved among the recording layers.

2. A method according to claim 1, wherein when the optical spot moves from a first recording layer being focused by the optical spot to a second recording layer, (a) reading a first layer address indicative of a first layer recorded on the first recording layer;

(b) comparing the first layer address with a second layer address indicative of the second recording layer to determine a moving amount and a moving direction for moving the optical spot between the recording layers; and (c) setting a number of the pulse-like signal supplied in accordance with the moving amount and the moving direction.

3. A method according to claim 1, wherein the pulse-like signal is comprised of a pair of pulses each having different polarity in moving from one layer to another layer.

4. An optical information reproducing method of using an optical disk having a plurality of recording layers recording optically detectable marks, wherein a laser beam is converged on each of the recording layers with an object lens driven by an actuator, and a light returned from the recording layer is detected to detect the marks, comprising the steps of:

when moving an optical spot of the laser from a first recording layer being focused by the optical spot to a second recording layer, detecting a light returned from one of the recording layers to count a number of layers where the optical spot passes through; and moving the optical spot while detecting a direction of the optical spot passing through the recording layers.

5. A method according to claim 4, wherein a peak of a signal indicative of a total amount of light returned from the recording layer is detected to count a passing of the optical spot through the recording layers.

* * * * *

UNITED STATES PATENT AND TRADEMARK OFFICE
CERTIFICATE OF CORRECTION

PATENT NO. : 5,614,938  
DATED : March 25, 1997  
INVENTOR(S) : Hisataka Sugiyama et al.

Page 1 of 1

It is certified that error appears in the above-identified patent and that said Letters Patent is hereby corrected as shown below:

Title page,  
Item [63] Related U.S. Appln. Data, replace "Continuation of Ser. No. 427,866, Apr. 26, 1995, abandoned," with -- Continuation of Ser. No. 427,866, Apr. 26, 1995, pending --.

Signed and Sealed this

Eighteenth Day of December, 2001

Attest:

JAMES E. ROGAN  
*Attesting Officer*  *Director of the United States Patent and Trademark Office*